(12) United States Patent
Hiwatashi et al.

(10) Patent No.: US 12,351,098 B2
(45) Date of Patent: Jul. 8, 2025

(54) EVALUATION SIMULATION SYSTEM FOR CONTROL INCLUDING FRONT LAMP CONTROL OF VEHICLE

(71) Applicant: SUBARU CORPORATION, Tokyo (JP)

(72) Inventors: Yutaka Hiwatashi, Tokyo (JP); Kentarou Yamasaki, Tokyo (JP); Satoshi Naruse, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/560,925

(22) PCT Filed: Jul. 5, 2022

(86) PCT No.: PCT/JP2022/026673
§ 371 (c)(1),
(2) Date: Nov. 14, 2023

(87) PCT Pub. No.: WO2024/009380
PCT Pub. Date: Jan. 11, 2024

(65) Prior Publication Data
US 2025/0074293 A1 Mar. 6, 2025

(51) Int. Cl.
*B60Q 1/08* (2006.01)
*B60Q 1/00* (2006.01)
*B60Q 1/14* (2006.01)

(52) U.S. Cl.
CPC ........... *B60Q 1/085* (2013.01); *B60Q 1/0023* (2013.01); *B60Q 1/143* (2013.01); *B60Q 2300/45* (2013.01)

(58) Field of Classification Search
CPC ........ B60Q 1/08; B60Q 1/085; B60Q 1/0023; B60Q 1/10; B60Q 1/12; B60Q 1/1423; B60Q 1/143; B60Q 2300/45
See application file for complete search history.

(56) References Cited

U.S. PATENT DOCUMENTS 8,993,951 B2 * 3/2015 Schofield ............. G06V 10/143
382/104

FOREIGN PATENT DOCUMENTS

JP H06-052703 A 2/1994

OTHER PUBLICATIONS

International Search Report issued in International Application No. PCT/JP2022/026674, dated Aug. 23, 2022.

* cited by examiner

*Primary Examiner* — Alan B Cariaso
(74) *Attorney, Agent, or Firm* — Rimon P.C.

(57) ABSTRACT

An evaluation simulation system includes a driver monitor, operation members, a model calculator, a monitor image generator, a camera module, and a detection control apparatus. The driver monitor displays a field-of-view image from a virtual vehicle corresponding to a vehicle. The operation members receive operations performed by a driver. The model calculator executes a model control of the virtual vehicle. The monitor image generator generates the field-of-view image after a movement. The detection control apparatus extracts information regarding a virtual object from a captured image obtained by the camera module, and outputs the information to the front lamp control apparatus. The model calculator generates control output information related to the front lamp control apparatus. The monitor image generator causes the field-of-view image under illumination by the front lamp control apparatus to be displayed.

13 Claims, 14 Drawing Sheets

[FIG. 1]
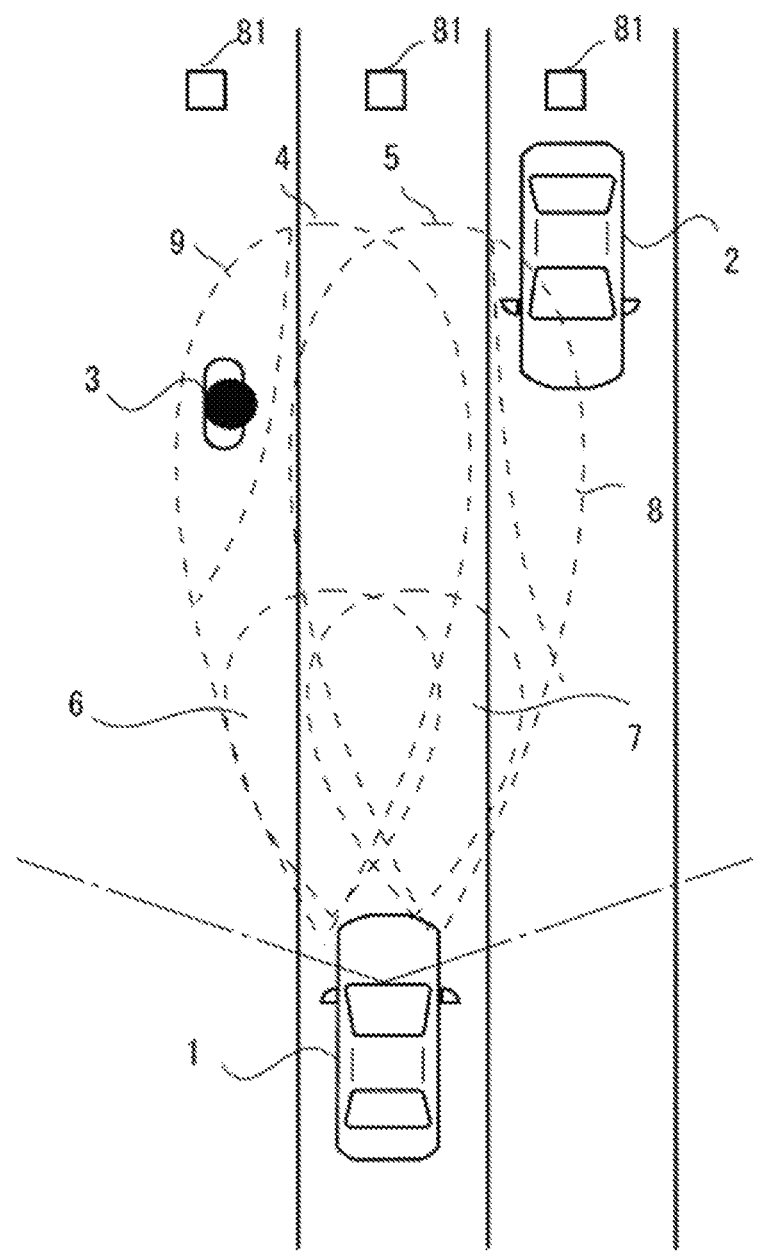

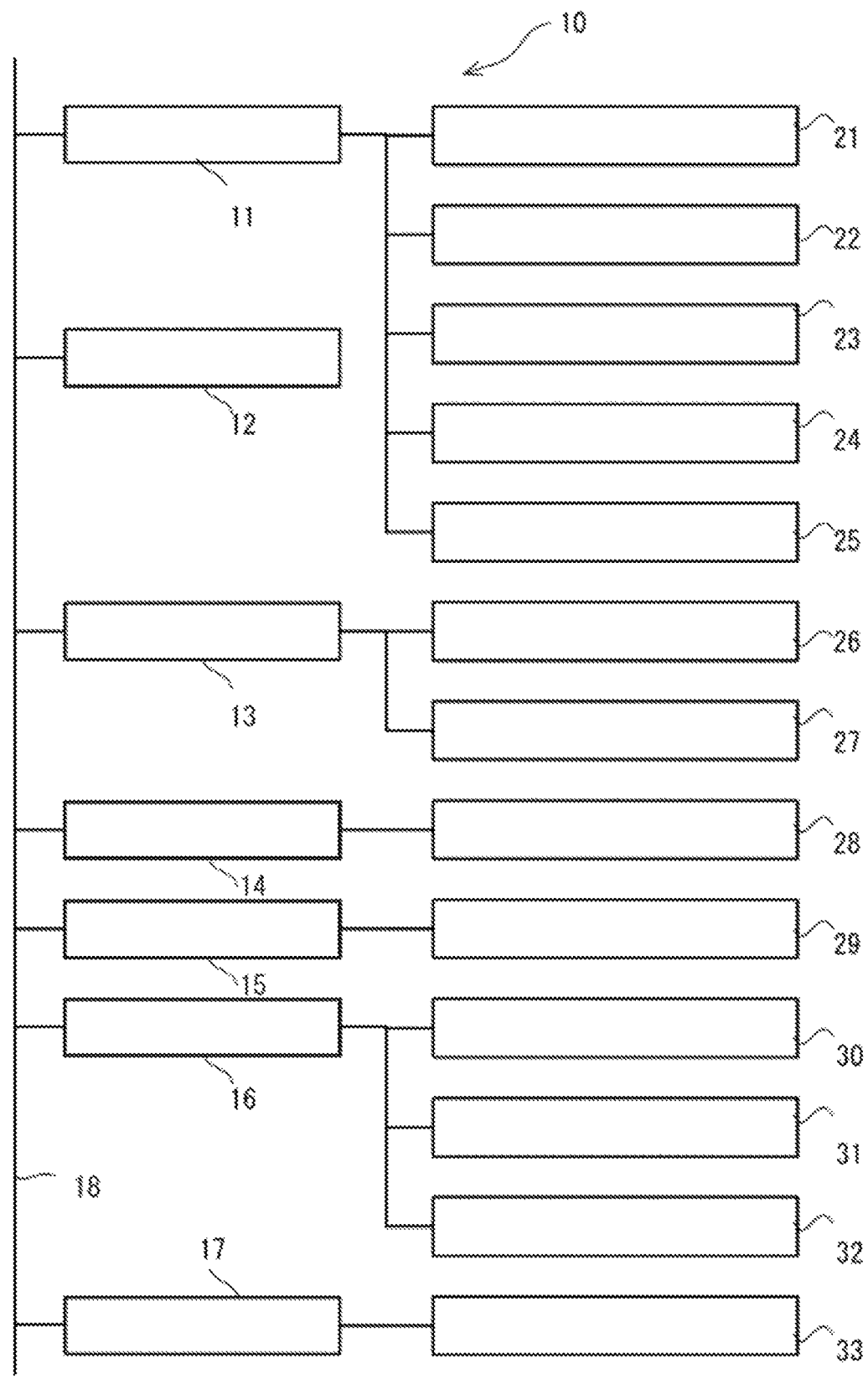
[FIG. 2]

[FIG.3]
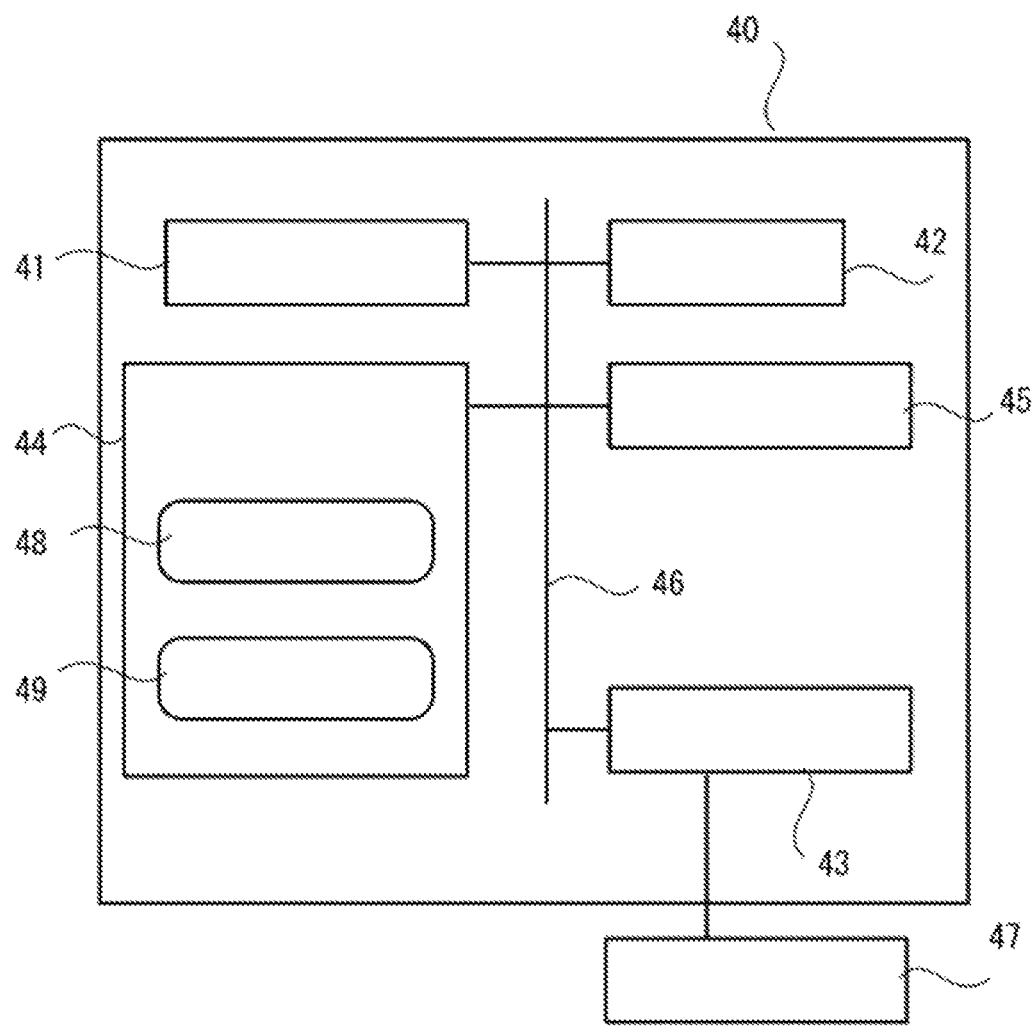

[FIG. 4]
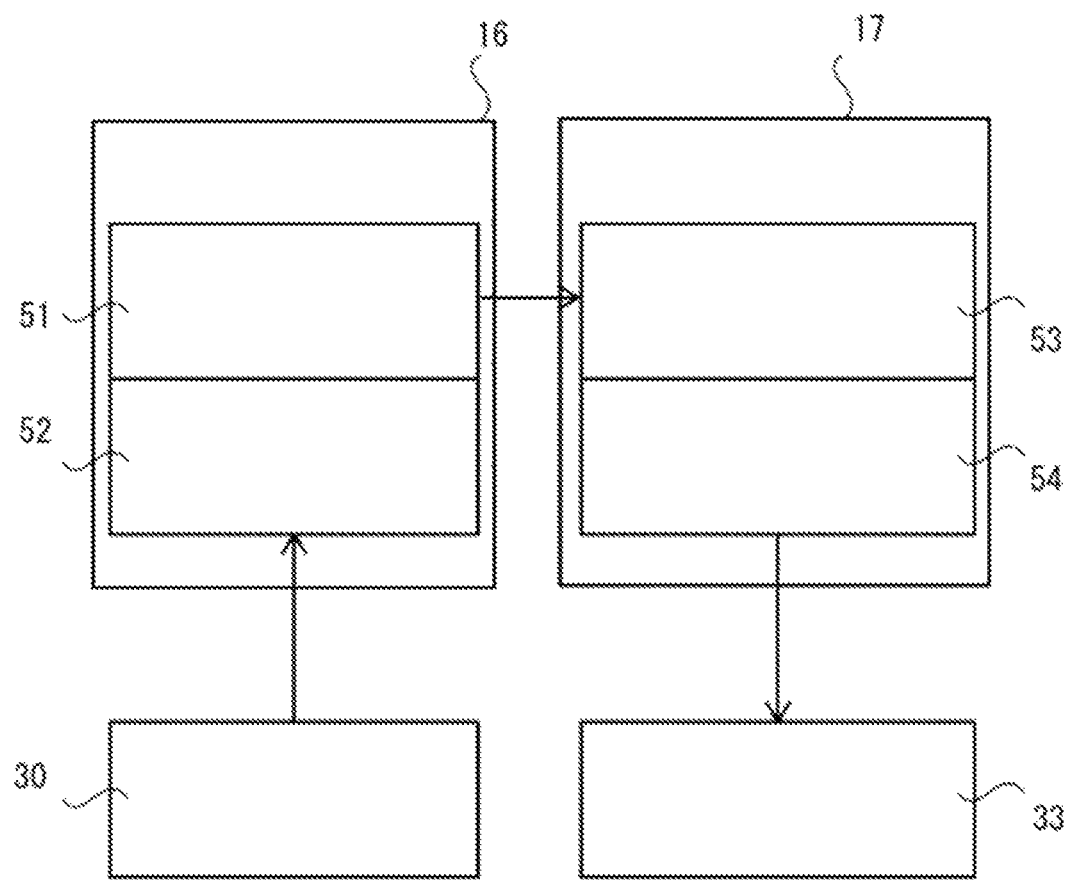

[FIG. 5]
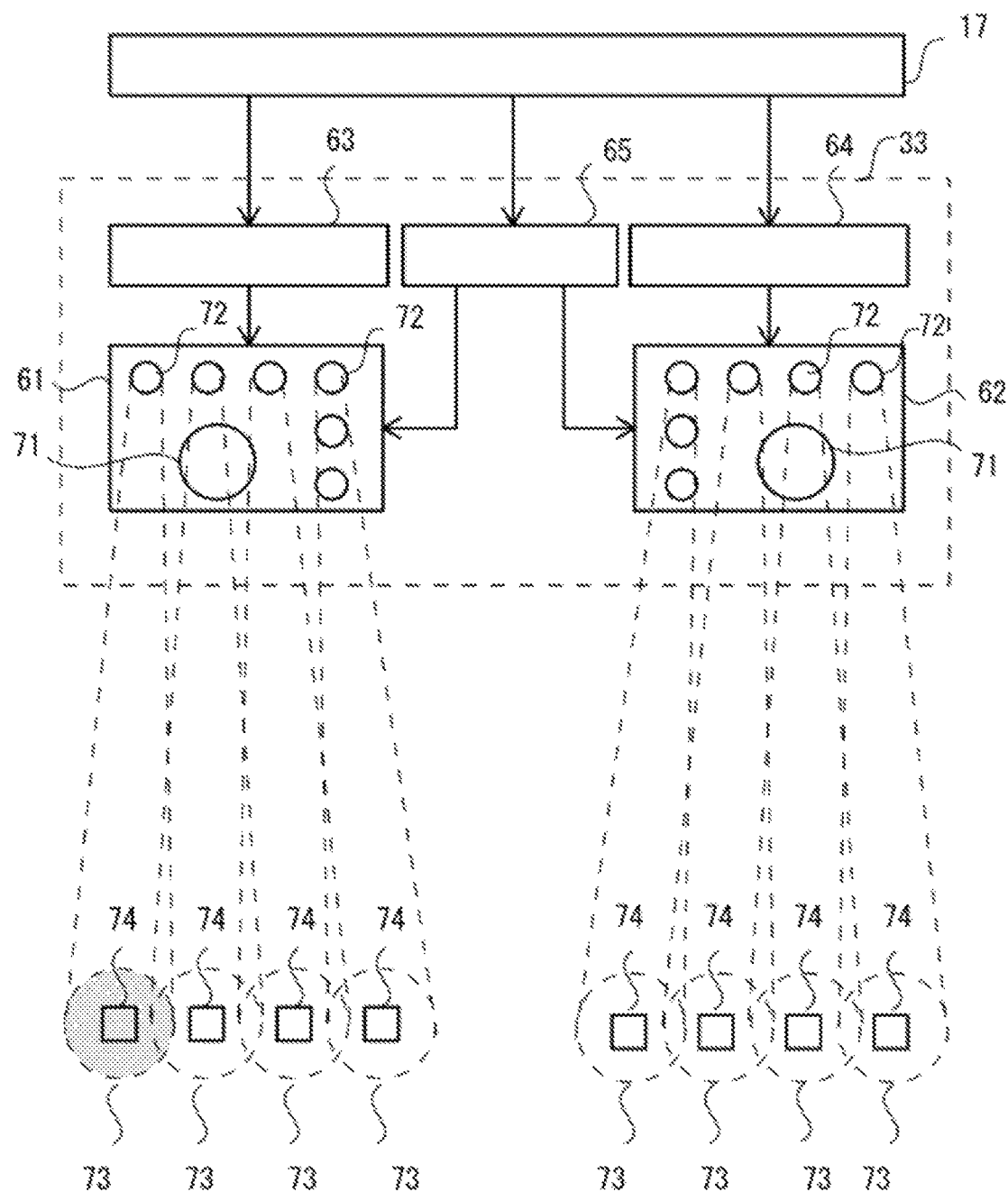

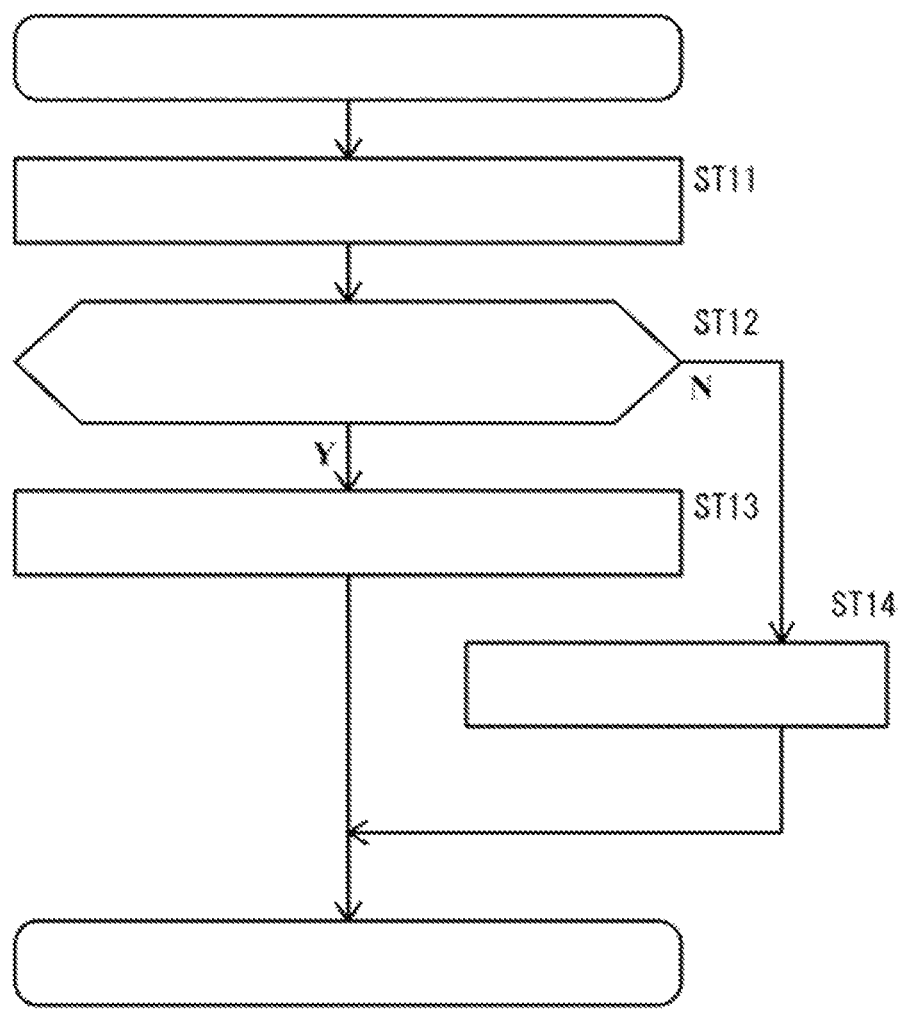
[FIG. 6]

[ FIG. 7 ]
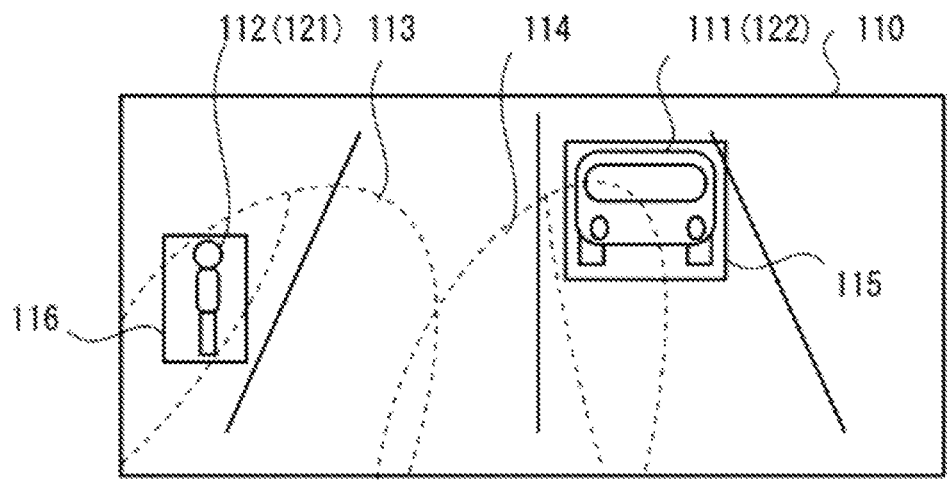
[ FIG. 8 ]
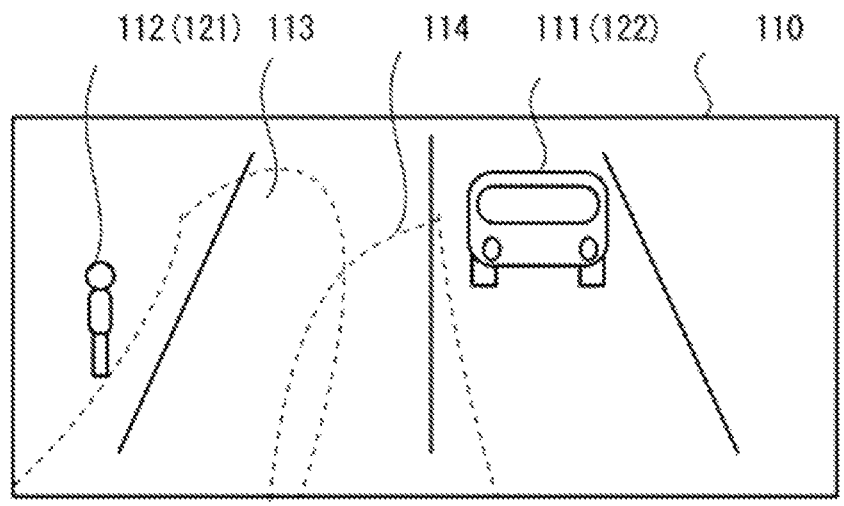

[FIG. 9]
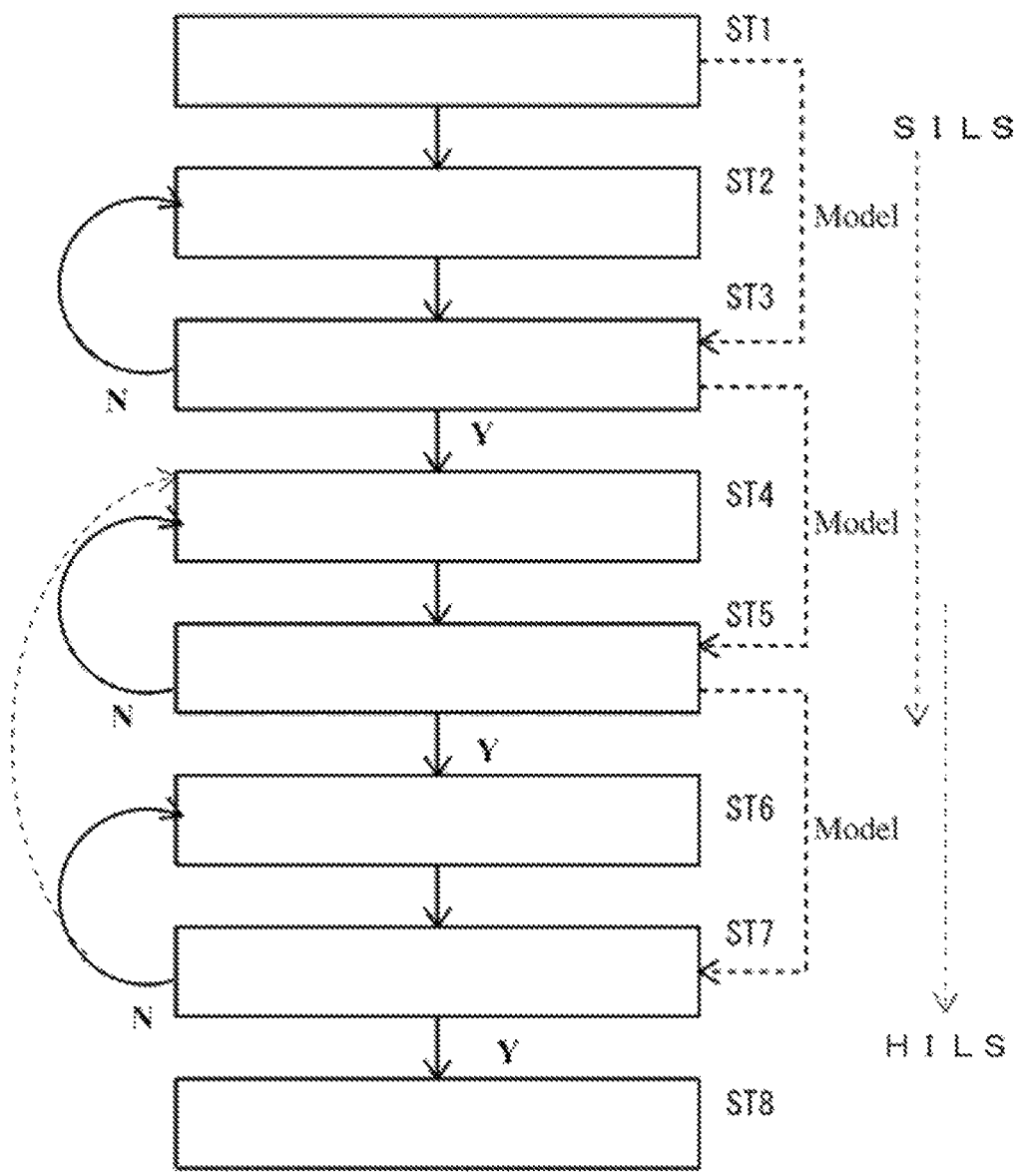

[FIG. 10]
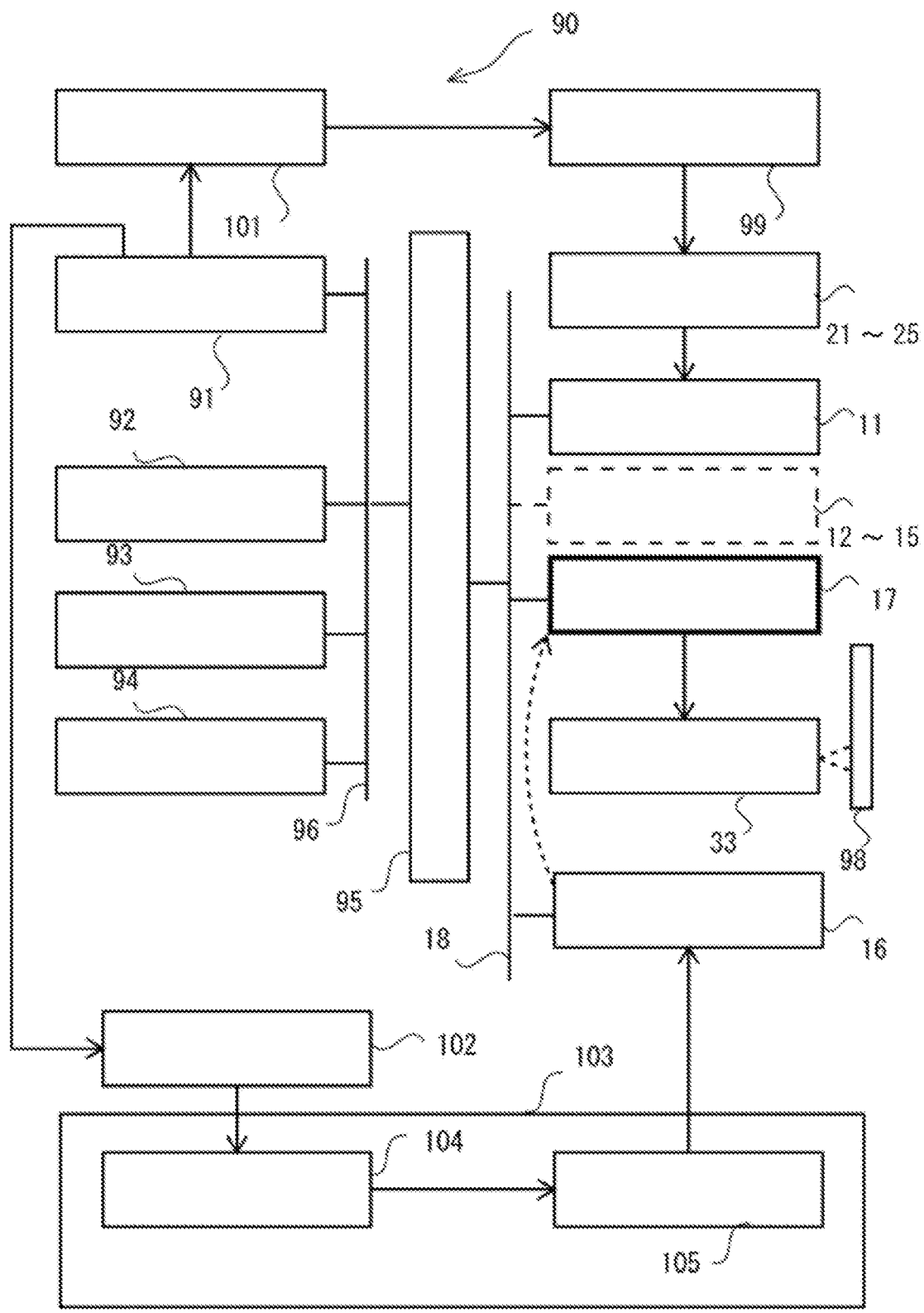

[ FIG. 11 ]
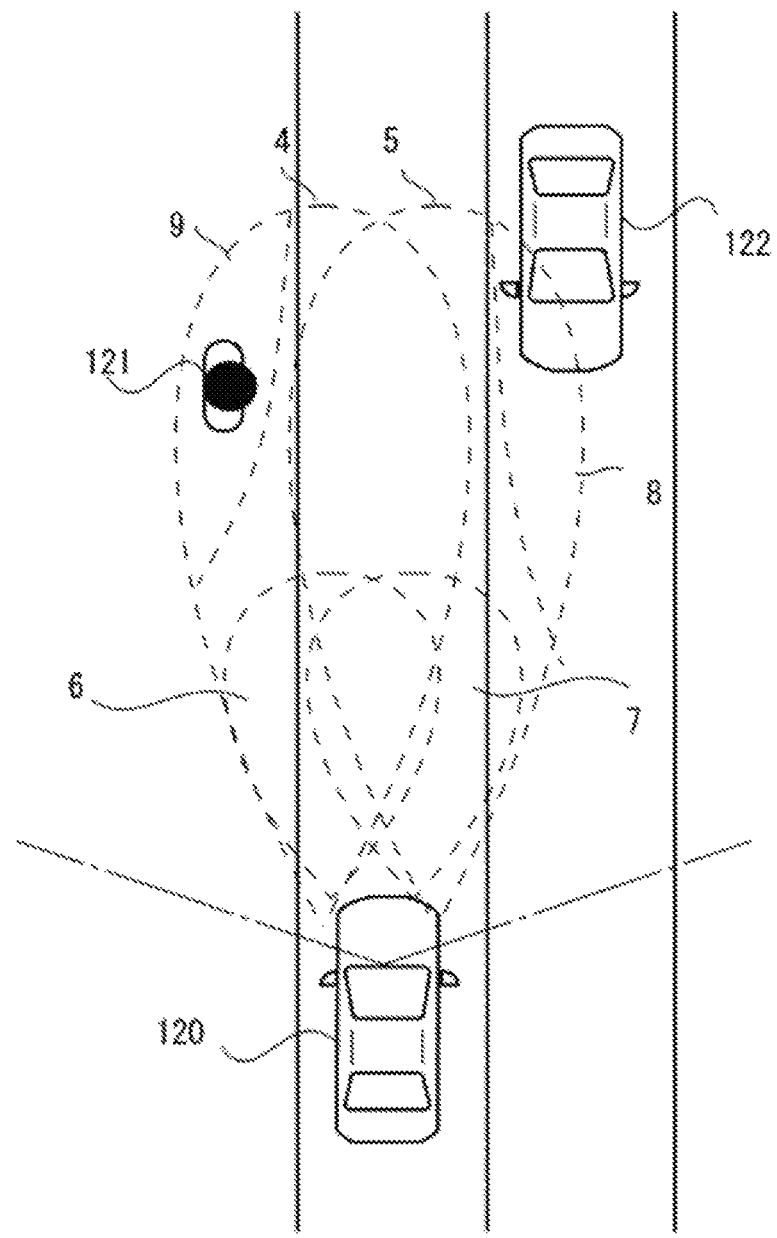

[FIG. 12]
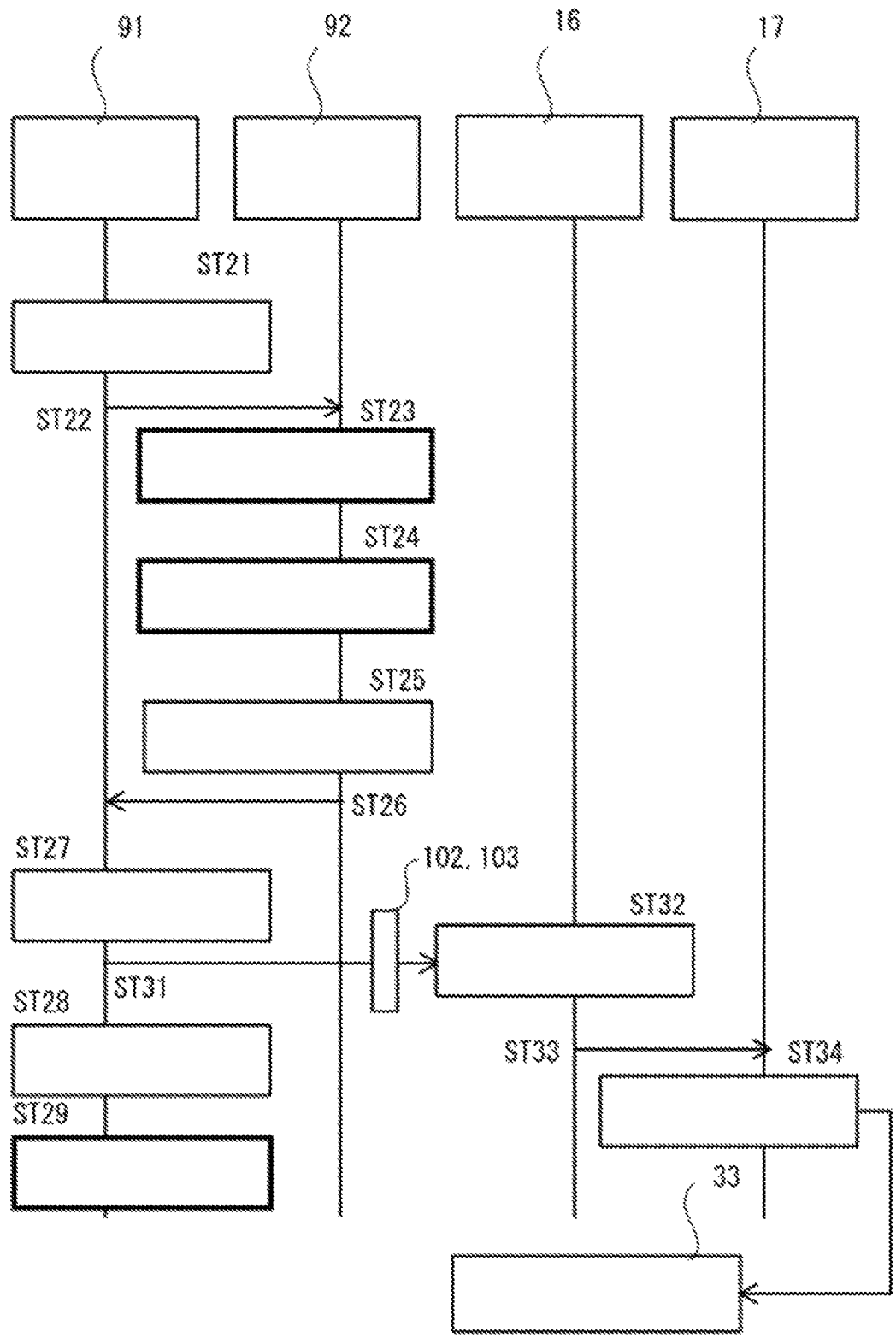

[FIG. 13]
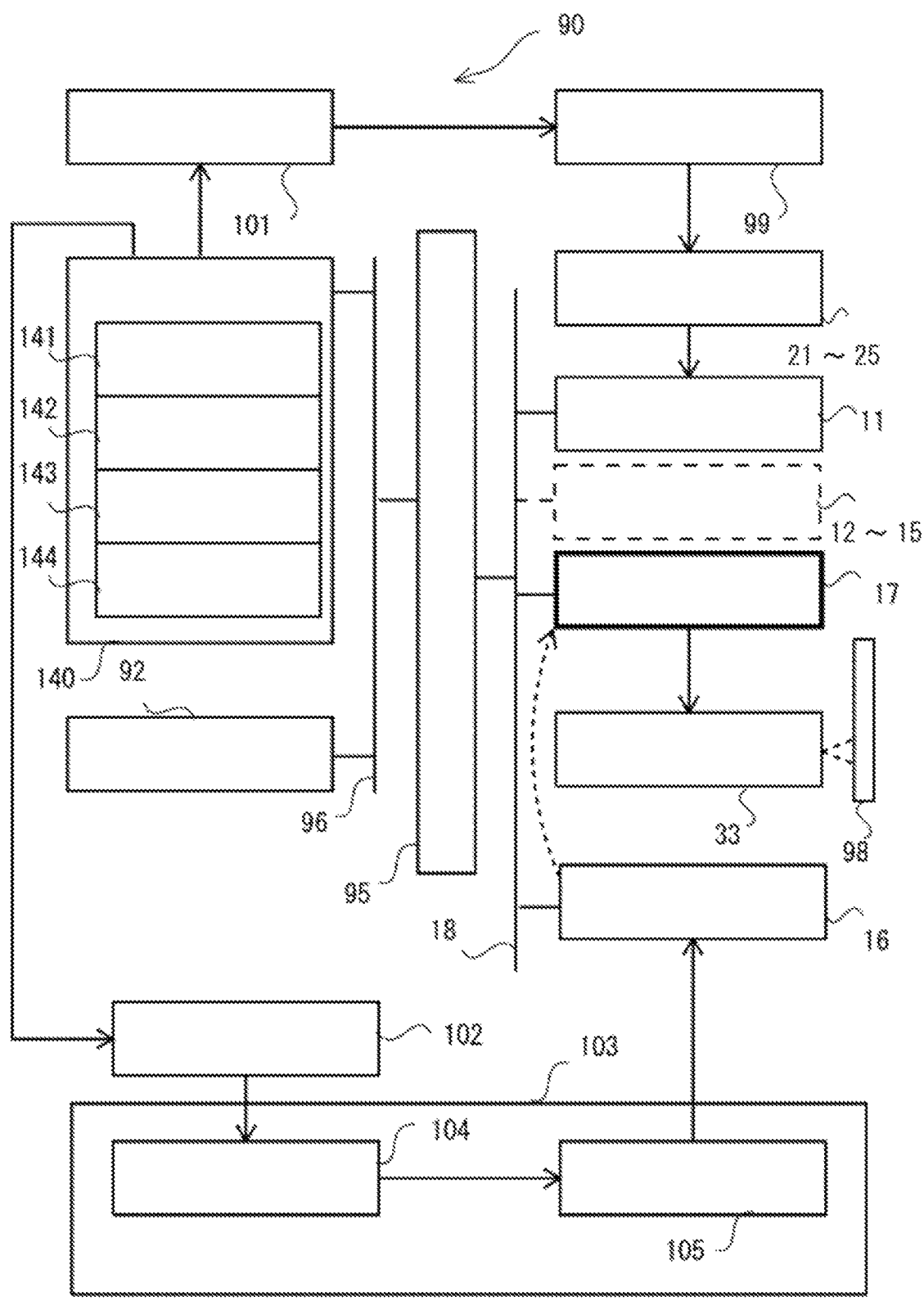

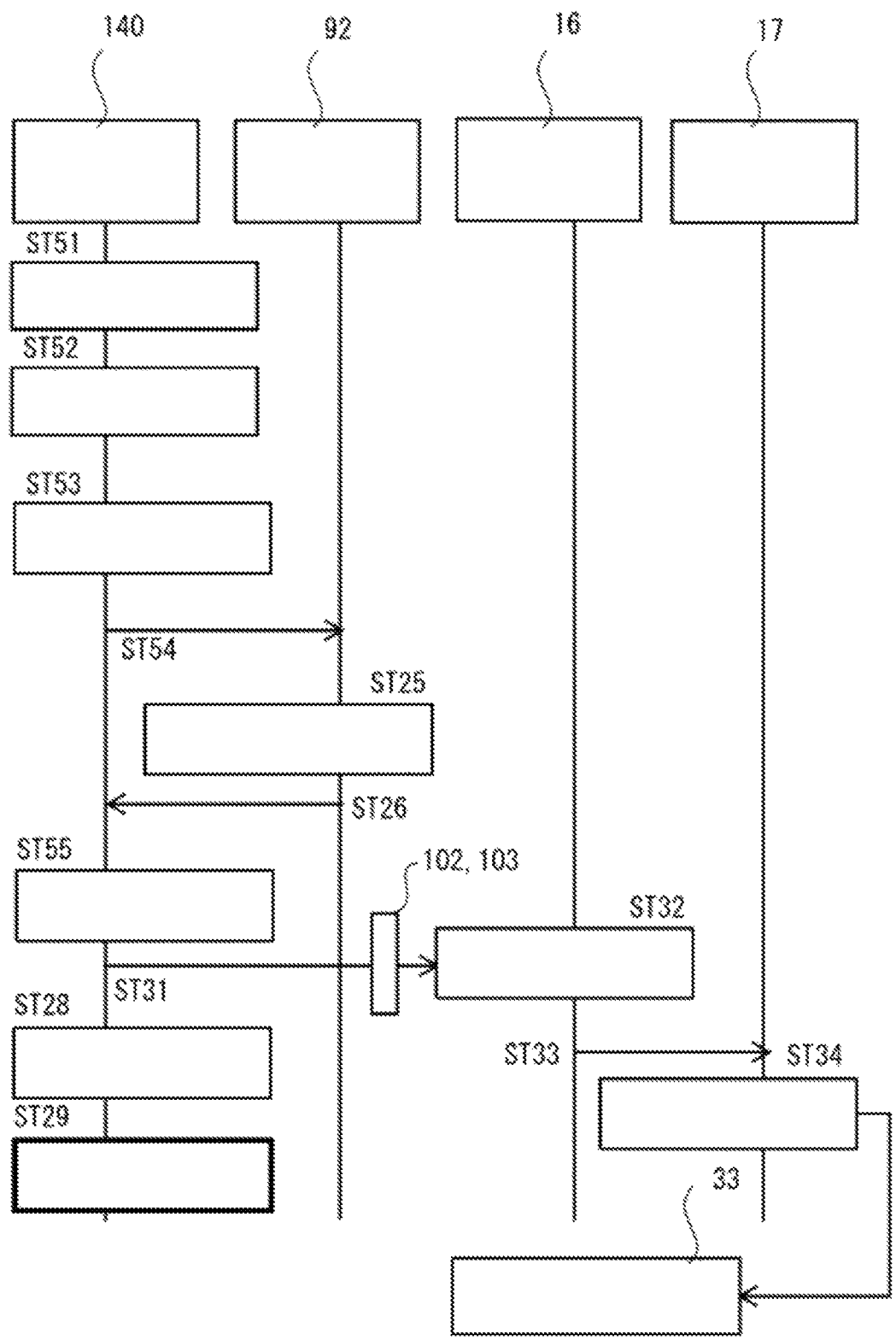

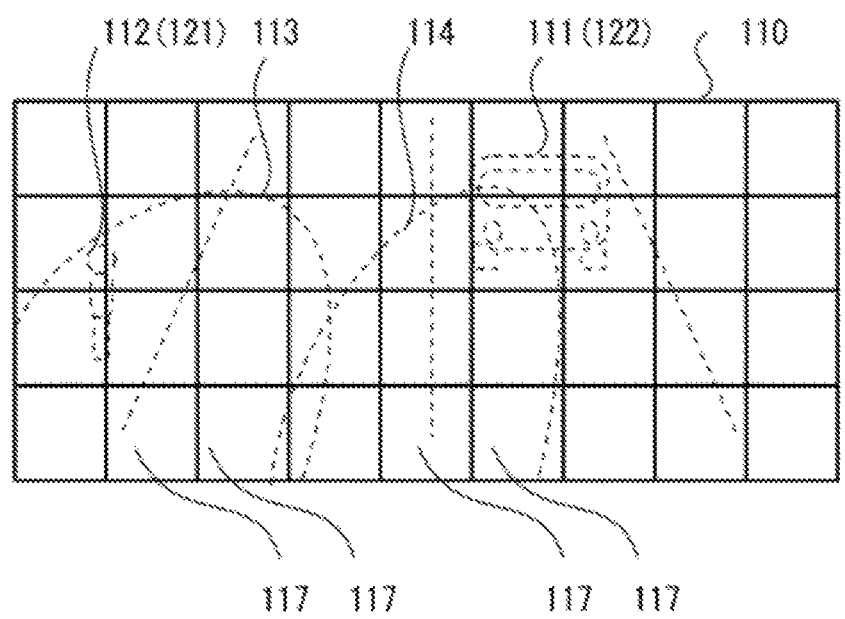
[FIG. 15]

EVALUATION SIMULATION SYSTEM FOR CONTROL INCLUDING FRONT LAMP CONTROL OF VEHICLE

CROSS-REFERENCE TO RELATED APPLICATIONS

This application is the U.S. National Phase under 35 U.S.C. § 371 of International Application No. PCT/JP2022/026673, filed on Jul. 5, 2022.

TECHNICAL FIELD

The invention relates to an evaluation simulation system for a control including a front lamp control of a vehicle.

BACKGROUND ART

In a vehicle such as an automobile, a front lamp apparatus is used to apply light toward the front that is a traveling direction of the vehicle.

Further, regarding a vehicle, it is proposed to adaptively control lighting of such a front lamp apparatus by a front lamp control apparatus based on a traveling environment or the like. The front lamp control apparatus is to be provided in the vehicle. Such a proposition is partially being put into practical use.

For example, Patent Literature 1 proposes a front lamp apparatus configured to so control an application range of light as to reduce glare felt by a driver of an oncoming vehicle or a pedestrian.

In addition, for a future front lamp apparatus for a vehicle, it has begun to consider using multiple light sources for high beam that allows for long-distance light application, for example. Such an advanced front lamp apparatus may be able to, for example, turn off some of the light sources to prevent application of strong light to an object such as an oncoming vehicle or a pedestrian, while applying desired strong light to other parts of the application range to secure visibility of a driver of the vehicle. Traveling safety of the vehicle improves.

CITATION LIST

Patent Literature

Patent Literature 1: Japanese Unexamined Patent Application Publication No. H06-052703

SUMMARY OF INVENTION

Problem to be Solved by the Invention

Incidentally, upon execution of a control of suppressing glare caused by application of light from a front lamp apparatus or the like, it is important that a front lamp control apparatus provided in a vehicle is able to execute a control suitable for its purpose. It is desirable that a content of the control, a start timing, an end timing, a degree of the control, etc. match the purpose. As with other control apparatuses provided in an automobile, the front lamp control apparatus typically controls application of light from the front lamp apparatus by a CPU executing a program. Note that a control apparatus for an automobile sometimes partially uses an advanced calculation function provided by hardware such as an ASIC (Application Specific Integrated Circuit) or a GPU (Graphical Processing Unit). However, even when a function of the control apparatus is partially performed by means of the hardware as described above, it is common to develop the function as a program and incorporate the program.

In addition, many control apparatuses are mounted on a vehicle such as an automobile. Therefore, respective control apparatuses are basically developed by different groups in many cases. For example, a detection system control apparatus is developed by one group, and a control apparatus that executes a control is developed by another group. In such a case, development of a vehicle involves the following. Based on designing ideas of each company, standards, social requirements, etc. for the vehicle, each control apparatus is assigned with a function and a specification. A content of a control to be performed by each control apparatus is determined to be suitable for the assigned function and specification. After the function and the specification are developed, it is necessary to verify suitability of the developed function and specification to the designing ideas, etc. It is also necessary to develop and verify a program and setting data based on the developed function and specification. Accumulation of such steady works creates an excellent vehicle. The same can be said in development of the front lamp control apparatus.

However, when an attempt is made to improve the degree of completion of the program and the setting data of such a front lamp control apparatus, verifications and corrections thereof easily lead to an enormous amount of work and man-hours.

In particular, a vehicle such as an automobile uses not only the front lamp control apparatus but uses many other control apparatuses. Further, the many control apparatuses including the front lamp control apparatus are required to favorably cooperate with each other in a vehicle in which they are provided. When an attempt is made to advance, as described above, the program and the setting data of the front lamp control apparatus to be used in such an advanced and complicated control system, and an attempt is also made to improve the degree of completion of the program and the setting data, such development can lead to a lot of work, which cannot be compared with that in development of an existing front lamp control apparatus. The number of times of verifications and corrections can also greatly increase.

Regarding a front lamp control apparatus to be provided in a vehicle to control a front lamp apparatus of the vehicle as described above, it is desired to reduce effort in development thereof.

Means for Solving the Problem

An evaluation simulation system for a control including a front lamp control of a vehicle according to an embodiment of the invention is configured to cause a front lamp control apparatus to operate when a virtual vehicle is caused to travel in a virtual space under an operation performed by a driver. The front lamp control apparatus is to be provided in the vehicle. The virtual vehicle corresponds to the vehicle. The evaluation simulation system includes a driver monitor, an operation member, a model calculator, a monitor image generator, a camera module, and a detection control apparatus. The driver monitor is configured to display, with respect to the driver, a field-of-view image from the virtual vehicle that is traveling. The field-of-view image is related to the virtual space. The operation member is configured to receive the operation performed by the driver. The model calculator is configured to calculate a movement of the virtual vehicle by executing a model control of the virtual vehicle. The movement of the virtual vehicle is based on the operation performed by the driver on the operation member. The monitor image generator is configured to calculate at least a position and a direction of the virtual vehicle after the virtual vehicle moves in the virtual space, and generate the field-of-view image after the virtual vehicle moves. The position and the direction of the virtual vehicle are based on the movement of the virtual vehicle calculated by the model calculator. The camera module is configured to display an image with respect to a vehicle outside camera provided in the virtual vehicle. The image is based on generation performed by the monitor image generator. The detection control apparatus is provided in the virtual vehicle together with the front lamp control apparatus and configured to execute a control in association with the front lamp control apparatus. The detection control apparatus is configured to extract, based on a captured image obtained by the vehicle outside camera in the camera module, a virtual object for which a light distribution control is to be performed, output information regarding the virtual object to the front lamp control apparatus, and cause the front lamp control apparatus to operate. The virtual object is present around the virtual vehicle that is traveling in the virtual space. The model calculator is further configured to generate control output information related to the front lamp control apparatus by executing the model control of the virtual vehicle. The monitor image generator is configured to acquire the control output information related to the front lamp control apparatus calculated by the model calculator, generate the field-of-view image under illumination by the front lamp control apparatus, and cause the driver monitor to display the field-of-view image.

An evaluation simulation system for a control including a front lamp control of a vehicle according to an embodiment of the invention is configured to cause a front lamp control apparatus to operate when a virtual vehicle is caused to travel in a virtual space under an operation performed by a driver. The front lamp control apparatus is to be provided in the vehicle. The virtual vehicle corresponds to the vehicle. The evaluation simulation system includes a driver monitor, an operation member, computer apparatus, a camera module, and a detection control apparatus. The driver monitor is configured to display, with respect to the driver, a field-of-view image from the virtual vehicle that is traveling. The field-of-view image is related to the virtual space. The operation member is configured to receive the operation performed by the driver. The computer apparatus is configured to calculate a movement of the virtual vehicle by executing a model control of the virtual vehicle. The movement of the virtual vehicle is based on the operation performed by the driver on the operation member. The computer apparatus is configured to calculate at least a position and a direction of the virtual vehicle after the virtual vehicle moves in the virtual space, and generate the field-of-view image after the virtual vehicle moves. The position and the direction of the virtual vehicle are based on the calculated movement of the virtual vehicle. The camera module is configured to display an image with respect to a vehicle outside camera provided in the virtual vehicle. The image is based on generation performed by the computer apparatus. The detection control apparatus is provided in the virtual vehicle together with the front lamp control apparatus and configured to execute a control in association with the front lamp control apparatus. The detection control apparatus is configured to extract, based on a captured image obtained by the vehicle outside camera in the camera module, a virtual object for which a light distribution control is to be performed, output information regarding the virtual object to the front lamp control apparatus, and cause the front lamp control apparatus to operate. The virtual object is present around the virtual vehicle that is traveling in the virtual space. The computer apparatus is further configured to generate control output information related to the front lamp control apparatus by executing the model control of the virtual vehicle. The monitor image generator is configured to, based on the control output information related to the front lamp control apparatus, generate the field-of-view image under illumination by the front lamp control apparatus, and cause the driver monitor to display the field-of-view image.

Effects of the Invention

In an embodiment of the invention, a front lamp control apparatus to be provided in a vehicle is caused to operate when a virtual vehicle corresponding to the vehicle is caused to travel in a virtual space under an operation performed by a driver. Accordingly, in the invention, it is possible to execute, regarding the front lamp control apparatus, an evaluation simulation for a control including a front lamp control of the vehicle, under a control in which the virtual vehicle travels in the virtual space under the operation performed by the driver. Using such an evaluation simulation system in development of a control to be performed by the front lamp control apparatus makes it possible to improve a degree of completion of a control to be performed by the front lamp control apparatus. In addition, the evaluation simulation system is under a control in which the virtual vehicle travels in the virtual space under the operation performed by the driver. Therefore, it is expectable that it is reliable and close to a result of an operation confirmation or a verification in a case where the front lamp control apparatus is actually provided in the vehicle. The use of the evaluation simulation system of the invention may effectively reduce effort in developing the front lamp control apparatus to be provided in the vehicle to control a front lamp apparatus of the vehicle.

In addition, the detection control apparatus used in the evaluation simulation system for the control including the front lamp control of the vehicle extracts, based on a captured image obtained by a vehicle outside camera in a camera module, a virtual object for which a light distribution control is to be performed, outputs information regarding the virtual object to the front lamp control apparatus, and causes the front lamp control apparatus to operate. The virtual object is present around the virtual vehicle that is traveling in the virtual space. In the evaluation simulation system of the invention, in a state where the front lamp control apparatus and a detection control apparatus to be provided in the vehicle therewith are coupled to a vehicle communication network and are in association with each other, the front lamp control apparatus is able to execute its control. The evaluation simulation system of the invention is not only able to perform an operation confirmation and a verification of the front lamp control apparatus alone, but is also able to perform an operation confirmation and a verification of a control in which the front lamp control apparatus and the detection control apparatus are in association with each other. It is possible to perform the operation confirmation and the verification, in an environment close to that of an actual vehicle, of the control to be performed by the front lamp control apparatus including a control in association with another control apparatus.

Further, in addition to calculating a movement of the virtual vehicle based on the operation performed by the driver on the operation member, a model calculator generates control output information related to the front lamp control apparatus by executing a model control of the virtual vehicle. The model calculator generates control output information to be generated by the front lamp control apparatus, independently of the front lamp control apparatus and the detection control apparatus. A monitor image generator is configured to acquire the control output information related to the front lamp control apparatus calculated by the model calculator, generate a field-of-view image under illumination by the front lamp control apparatus, and cause a driver monitor to display the field-of-view image. With the field-of-view image on the driver monitor that changes in accordance with the operation performed by the driver, the driver is able to have a sense of driving an actual vehicle and is able to operate the operation member of the evaluation simulation system without having a sense of strangeness.

In contrast, for example, in an assumed case where the monitor image generator acquires the control output of the front lamp control apparatus in development and generates the field-of-view image under the illumination by the front lamp control apparatus, the monitor image generator is not able to generate the field-of-view image if the monitor image generator fails to acquire a control output from the front lamp control apparatus in development. In addition, when the control output is acquired from the front lamp control apparatus, a delay in control increases. In the invention, the control output information related to the front lamp control apparatus calculated by the model calculator is acquired. Therefore, a real-time loop process of such a traveling control loop involving the driver is not inhibited. The evaluation simulation system is able to allow the virtual vehicle corresponding to the vehicle to travel in the virtual space under the operation performed by the driver and to allow the front lamp control apparatus to execute a control while the virtual vehicle is traveling, independently of whether the control performed by the front lamp control apparatus is appropriate or not. The evaluation simulation system is able to execute a real-time simulation without being influenced by the delay in the front lamp control.

With use of such an evaluation simulation that causes the virtual vehicle corresponding to the vehicle to travel in the virtual space under the operation performed by the driver, a reduction is expectable in effort in developing the front lamp control apparatus to be provided in the vehicle to control the front lamp apparatus of the vehicle.

BRIEF DESCRIPTION OF DRAWINGS

FIG. 1 is an explanatory diagram of an example of a traveling environment of an automobile that is able to travel based on an operation performed by a driver.

FIG. 2 is an explanatory diagram of a control system including a front lamp control apparatus for the automobile in FIG. 1.

FIG. 3 is an explanatory diagram of a basic hardware configuration of each of various control apparatuses for the automobile.

FIG. 4 is an explanatory diagram of an example of an input and output relationship of a control related to the front lamp control apparatus.

FIG. 5 is an explanatory diagram of an example of a specific configuration of a front lamp apparatus to be controlled by the front lamp control apparatus.

FIG. 6 is a basic flowchart of a front lamp anti-glare control to be executed by a CPU of the front lamp control apparatus.

FIG. 7 is an explanatory diagram of a first field-of-view image for the driver.

FIG. 8 is an explanatory diagram of a second field-of-view image for the driver.

FIG. 9 is an explanatory diagram of an example of a development procedure of the automobile.

FIG. 10 is a configuration diagram of an evaluation simulation system for a control including a front lamp control of the automobile, according to a first embodiment of the invention.

FIG. 11 is an explanatory diagram of an example of a traveling environment of a virtual automobile that travels in a virtual space based on an operation performed by the driver.

FIG. 12 is a timing chart of a process for generating a traveling environment image prior to the field-of-view image in the evaluation simulation system in FIG. 10.

FIG. 13 is a configuration diagram of an evaluation simulation system for a control including a front lamp control of the automobile, according to a second embodiment of the invention.

FIG. 14 is a timing chart of a control up to generation of the field-of-view image in the evaluation simulation system in FIG. 13.

FIG. 15 is an explanatory diagram of a third field-of-view image for the driver, for describing a process of obtaining illuminance of an object in an evaluation simulation system according to a third embodiment of the invention.

MODES FOR CARRYING OUT THE INVENTION

Some embodiments of the invention will be described below based on the drawings.

First Embodiment

FIG. 1 is an explanatory diagram of an example of a traveling environment of an automobile 1. The automobile 1 is able to travel based on an operation performed by a driver.

The automobile 1 in FIG. 1 is an example of a vehicle. Examples of the vehicle include a large vehicle, a motorcycle, and a personal mobility in addition to this. The large vehicle is, for example, a truck.

In FIG. 1, the automobile 1 travels on a straight road, straight along the road. The road is to be used also by a pedestrian 3, other vehicles, etc. In this case, the pedestrian 3 may come out in front of the automobile 1, or an oncoming vehicle 2 may come close to the automobile 1. Upon occurrence of such a situation, the driver of the automobile 1 has to operate traveling of the automobile 1 to deal with such an obstacle to the traveling. Note that some automobiles 1 are able to travel by automatic driving. Even if the automobile 1 is able to travel by such automatic driving, for example, in case of emergency, it is necessary to allow an occupant, as the driver, to cause the automobile 1 to travel. Thus, even if the automobile 1 is able to travel by the automatic driving, it is necessary to execute a similar avoidance control automatically or based on an operation performed by the driver.

FIG. 1 also illustrates, as application ranges of light from a front lamp apparatus 33 of the automobile 1, a left high-beam application range 4, a right high-beam application range 5, a left low-beam application range 6, and a right low-beam application range 7. Such application of light allows the driver of the automobile 1 to visually recognize, also at night, a traveling environment in a direction in which the automobile 1 travels. This allows, when the pedestrian 3 or the oncoming vehicle 2 described above is present, the driver of the automobile 1 to perform an avoidance operation to deal with it. Traveling safety of the automobile 1 improves.

FIG. 2 is an explanatory diagram of a control system 10 including a front lamp control apparatus 17 for the automobile 1 in FIG. 1.

The control system 10 in FIG. 2 to be provided in the automobile 1 includes multiple control apparatuses and a vehicle communication network 18 to which the control apparatuses are coupled.

The vehicle communication network 18 may be, for example, an information communication network 96 for the automobile 1, such as a CAN (Controller Area Network) or a LIN (Local Interconnect Network). Such a vehicle communication network 18 typically includes bus cables and a central gateway (CGW) to which the bus cables are bus-coupled. The control apparatuses are coupled to the bus cables in a distributed manner. Each of the control apparatuses sends a packet to the bus cable and receives a packet addressed to the control apparatus itself from the bus cable. The packet includes information. The central gateway executes a routing process between the bus cables based on a destination of the packet. Through such a control by means of the vehicle communication network 18, the control apparatuses provided in the automobile 1 are able to perform mutual transmission and reception of necessary information while executing the respective controls. The control apparatuses provided in the automobile 1 are able to cooperate with each other to control the traveling of the automobile 1, etc.

FIG. 2 also illustrates, as examples of the control apparatuses, an operation control apparatus 11, a traveling control apparatus 12, a driving control apparatus 13, a braking control apparatus 14, a steering control apparatus 15, a detection control apparatus 16, and the front lamp control apparatus 17. In addition to these control apparatuses, the automobile 1 may be provided with, for example, an in-vehicle monitoring control apparatus, an air-conditioning control apparatus, a lamp control apparatus, etc. In addition, the control apparatuses may be provided in the automobile 1 in groups into which the control apparatuses are put based on, for example, functions of the control apparatuses or devices coupled to the control apparatuses.

For example, coupled to the operation control apparatus 11 are a steering wheel 21, an accelerator pedal 22, a brake pedal 23, a shift lever 24, and a touch panel 25. Other operation members to be operated by the driver may also be coupled to the operation control apparatus 11. The touch panel 25 may display, for example, an unillustrated operation button to switch an operation of the front lamp apparatus 33 between being turned on and being turned off. The operation control apparatus 11 controls an operation of each of the operation members, and acquires an operation input performed by the driver on each of the operation members. The operation control apparatus 11 sends information regarding the operation input, for example, to the traveling control apparatus 12 via the vehicle communication network 18.

The traveling control apparatus 12 controls the traveling of the automobile 1. When receiving the information regarding the operation input from the operation control apparatus 11, the traveling control apparatus 12 generates a control amount based on the operation performed by the driver, and sends the generated control amount, for example, to the driving control apparatus 13, the braking control apparatus 14, or the steering control apparatus 15 via the vehicle communication network 18. For example, the traveling control apparatus 12 may generate a control amount related to deceleration corresponding to an operation amount of the brake pedal 23, and may send the control amount to the braking control apparatus 14 via the vehicle communication network 18.

Note that the traveling control apparatus 12 may generate a control amount corresponding to an amount of the operation performed by the driver, or may generate a control amount resulting from adjustment to the amount of the operation performed by the driver. In the latter case, it is possible to assist, by adjustment, driving performed by the driver. Alternatively, the traveling control apparatus 12 may generate a control amount independently of the operation performed by the driver, and may send the generated control amount. In this case, the traveling control apparatus 12 is able to allow the automobile 1 to travel by the automatic driving.

Coupled to the driving control apparatus 13 are an engine 26, a transmission 27, etc. that are to accelerate the automobile 1. For example, when receiving a control amount related to acceleration based on an operation performed on the accelerator pedal 22, the driving control apparatus 13 controls an operation of the engine 26 in accordance with the received control amount.

Coupled to the braking control apparatus 14 is a brake apparatus 28 that is to decelerate the automobile 1. For example, when receiving a control amount related to deceleration based on an operation performed on the brake pedal 23, the braking control apparatus 14 controls an operation of the brake apparatus 28 in accordance with the received control amount.

Coupled to the steering control apparatus 15 is a steering apparatus 29 that is to maintain or change a traveling direction of the automobile 1. For example, when receiving a control amount related to steering based on an operation performed on the steering wheel 21, the steering control apparatus 15 controls an operation of the steering apparatus 29 in accordance with the received control amount.

Coupled to the front lamp control apparatus 17 is the front lamp apparatus 33. The front lamp apparatus 33 is provided to face the front at a front portion of the automobile 1, and applies light toward a region in front of the automobile 1. The front lamp apparatus 33 basically includes a light source for high beam and a light source for low beam.

Further, the front lamp control apparatus 17 may control an operation state of the front lamp apparatus 33, such as an on state or an off state, for example, based on the information regarding the operation input acquired from the operation control apparatus 11.

Further, the front lamp control apparatus 17 may individually control an on state and an off state of each of multiple light sources provided in the front lamp apparatus 33.

Further, the front lamp control apparatus 17 may individually control a direction and an amount of light from each of the light sources provided in the front lamp apparatus 33.

A content of a control to be performed by the front lamp control apparatus 17 depends on the function and performance of the front lamp apparatus 33 that is a device to be controlled by the front lamp control apparatus 17.

Coupled to the detection control apparatus 16 are multiple in-vehicle sensors that are provided in the automobile 1 and are to detect a traveling state, the traveling environment, and the like of the automobile 1. Examples of the in-vehicle sensors include a vehicle outside camera 30, a Lidar 31, and a laser apparatus 32.

The vehicle outside camera 30 captures an image of the traveling environment around the automobile 1. The vehicle outside camera 30 preferably captures an image at least of a region in front of the automobile 1 that is a direction in which the automobile 1 travels. Multiple vehicle outside cameras 30 may capture respective images of portions into which a region all around the automobile 1 is divided. In addition, the vehicle outside camera 30 may be a monocular camera, or may be a compound eye camera such as a stereo camera. Regarding the stereo camera, an arrangement of two cameras is defined. The stereo camera is thus able to calculate information regarding a relative distance and a relative direction of an object, whose image is to be captured, with respect to the own vehicle, based on a parallax based on a difference in position between the two cameras.

The Lidar 31 scans a region surrounding the automobile 1 by an output wave, and generates space information indicating the traveling environment around the automobile 1. The output wave has a higher frequency than visible light.

The laser apparatus 32 outputs laser light toward a region in front of the automobile 1, and measures a distance to an object in front of the automobile 1. The laser apparatus 32 may scan the region in front of the automobile 1 with the laser light.

The detection control apparatus 16 sends information regarding detection results of the in-vehicle sensors or information regarding secondary detection results generated based on them, for example, to the traveling control apparatus 12, the front lamp control apparatus 17, etc. via the vehicle communication network 18. The detection control apparatus 16 may analyze, for example, a detection result regarding an outside of the vehicle obtained by a sensor such as the vehicle outside camera 30, and may generate information regarding a secondary detection result related to the pedestrian 3, a preceding vehicle, the oncoming vehicle 2, etc. present around the automobile 1, for example, in front of the automobile 1. The information regarding the secondary detection result in this case preferably includes information regarding a kind (an attribute) of an object, a relative distance, a relative direction, etc. that are determined regarding an object present around the automobile 1. Here, the information regarding the kind (the attribute) of the object may be, for example, information regarding the attribute of the object itself such as a pedestrian or a vehicle. Further, the information regarding the vehicle may be information classified into a preceding vehicle on the same lane, a parallel vehicle on another lane, an oncoming vehicle, etc. The traveling control apparatus 12 is thus able to acquire the state of the automobile 1 and the state of the traveling environment in real time during traveling, and to so control the traveling of the automobile 1 as to avoid interference with the object such as the pedestrian 3.

FIG. 3 is an explanatory diagram of a basic hardware configuration of a control apparatus 40 of any kind for the automobile 1.

The control apparatus 40 of any kind illustrated in FIG. 2 represents, for example, the detection control apparatus 16 or the front lamp control apparatus 17. The control apparatus 40 has the hardware configuration as illustrated in FIG. 3.

The control apparatus 40 in FIG. 3 includes a communication port 41, an input and output port 43, a timer 42, a memory 44, a CPU (Central Processing Unit) 45, and an internal bus 46. The communication port 41, the input and output port 43, the timer 42, the memory 44, and the CPU 45 are coupled to the internal bus 46.

The communication port 41 is coupled to the vehicle communication network 18 described above. The communication port 41 performs transmission and reception of a packet with another control apparatus via the vehicle communication network 18 to transmit and receive information.

Coupled to the input and output port 43 is a device 47 of any kind coupled to the control apparatus 40. For example, regarding the detection control apparatus 16, the device 47 such as the vehicle outside camera 30 is coupled to the input and output port 43. Further, regarding the front lamp control apparatus 17, the front lamp apparatus 33 is coupled to the output port 43 as the device 47.

In addition, although not particularly illustrated, another control apparatus may be coupled to the input and output port 43 on an as-needed basis by means of a signal line. In this case, the control apparatus 40 in FIG. 3 is able to perform high-speed transmission and reception of information with another control apparatus via the input and output port 43. The high-speed transmission and reception of information do not cause variation in amount of delay.

The timer 42 measures a time, an elapsed period of time, etc. The time of the timer 42 may be corrected based on a time generated by an unillustrated GNSS (Global Navigation Satellite System) receiver, a time of the central gateway, or the like.

The memory 44 holds, for example, a control program 48 and control data 49. The control program 48 is to be executed by the CPU 45. The control data 49 is to be used when the CPU 45 executes the control program 48. The control data 49 may include information regarding, for example, various kinds of setting data to be used in a control and parameters to be used in a control. The control program 48 and the control data 49 are created by coding in a process of development. In addition, the memory 44 may hold, for example, a control log of the CPU 45. The memory 44 may include, for example, a semiconductor memory, an HDD (Hard Disk Drive), and a RAM (Random Access Memory). The semiconductor memory 44 may be volatile or non-volatile.

The CPU 45 reads and executes the control program 48 recorded in the memory 44. A controller is thus implemented in the control apparatus 40. The CPU 45 serving as the controller of the control apparatus 40 controls an overall operation of the control apparatus 40, and controls an operation of the device 47 coupled to the control apparatus 40.

FIG. 4 is an explanatory diagram of an example of an input and output relationship of a control related to the front lamp control apparatus 17.

FIG. 4 illustrates the vehicle outside camera 30, the detection control apparatus 16, the front lamp control apparatus 17, and the front lamp apparatus 33.

Further, in the detection control apparatus 16, an input and output control program 52 and a control program 51 are illustrated. The input and output control program 52 is to be executed by the CPU 45. The control program 51 is to be executed by the CPU 45. Further, control data is regarded as being included in the control program 51 in the illustration.

Further, in the front lamp control apparatus 17, an input and output control program 54 and a control program 53 are illustrated. The input and output control program 54 is to be executed by the CPU 45. The control program 53 is to be executed by the CPU 45. Further, control data is regarded as being included in the control program 53 in the illustration.

In a case of this example, the vehicle outside camera 30 outputs the captured image of the region in front of the automobile 1 to the input and output port 43 of the detection control apparatus 16. In the detection control apparatus 16, the CPU 45 executes the input and output control program 52 and thereby acquires the captured image. In addition, the CPU 45 executes the control program 51, and thereby analyzes the captured image to generate information regarding the kind (the attribute), the relative distance, and the relative direction of the object present in front of the automobile 1 and sends the generated information to the front lamp control apparatus 17.

In the front lamp control apparatus 17, the CPU 45 executes the control program 53, and thereby receives the information regarding the object present in front of the automobile 1 as the control input information and generates the control output information related to the front lamp apparatus 33. In addition, in the detection control apparatus 16, the CPU 45 executes the input and output control program 54, and thereby outputs a control signal from the input and output port 43. The control signal is based on the generated control output information. The front lamp apparatus 33 controls an on state, an off state, an amount of light, a direction, etc. of each of the light sources provided in the front lamp apparatus 33, based on the control signal inputted from the input and output port 43.

FIG. 5 is an explanatory diagram of an example of a specific configuration of the front lamp apparatus 33 to be controlled by the front lamp control apparatus 17.

The front lamp apparatus 33 in FIG. 5 includes a right front lamp module 61, a left front lamp module 62, a right light emission controller 63, a left light emission controller 64, and an actuator 65.

The right front lamp module 61 includes a low-beam light source 71 and multiple high-beam light sources 72.

The left front lamp module 62 includes a low-beam light source 71 and multiple high-beam light sources 72.

The right light emission controller 63 performs a control individually for each light source, and thus controls turning-off of light, light emission, and an amount of light of each of the light sources 71 and 72 provided in the right front lamp module 61. The right light emission controller 63 performs the control based on the control output information which the front lamp control apparatus 17 outputs to the front lamp apparatus 33.

The left light emission controller 64 performs a control individually for each light source, and thus controls turning-off of light, light emission, and an amount of light of each of the light sources 71 and 72 provided in the left front lamp module 62. The left light emission controller 64 performs the control based on the control output information which the front lamp control apparatus 17 outputs to the front lamp apparatus 33.

The actuator 65 performs a control individually for each light source, and thus controls a direction of each of the light sources 71 and 72 provided in the right front lamp module 61 and a direction of each of the light sources 71 and 72 provided in the left front lamp module 62.

Such a front lamp apparatus 33 is able to perform a control individually for each light source, and is thus able to control the light sources 71 and 72 provided in the front lamp apparatus 33 based on the control output information which the front lamp control apparatus 17 generates and outputs.

FIG. 5 also illustrates application ranges 73 indicated by respective dotted-line circles for the high-beam light sources 72. The application ranges 73 are ranges applied with the light from the high-beam light sources 72 of the front lamp apparatus 33.

For example, when all of the high-beam light sources 72 of the front lamp apparatus 33 are in the on state, light is applied to all of the application ranges 73. This allows for a large application range.

In such a state, if the high-beam light source 72 at the left end in the drawing is turned off, the application range is switched to that including the application ranges 73 not being hatched in the drawing.

As described above, the front lamp control apparatus 17 is able to control the application ranges 73 of the light emitted by the front lamp apparatus 33 by controlling respective operation states of the high-beam light sources 72 of the front lamp apparatus 33. The front lamp control apparatus 17 is able to apply light toward the front that is the traveling direction of the automobile 1, with use of the front lamp apparatus 33.

FIG. 6 is a basic flowchart of a front lamp anti-glare control to be executed by the CPU 45 of the front lamp control apparatus 17.

When traveling is performed with the high beam light sources 72 of the front lamp apparatus 33 being in the on state, the CPU 45 of the front lamp control apparatus 17 may repeatedly execute the front lamp anti-glare control in FIG. 6 in order to suppress glare of the pedestrian 3, the driver of the oncoming vehicle 2, the driver of the preceding vehicle, and the like.

Further, the front lamp anti-glare control in FIG. 6 is recorded in the memory 44 of the front lamp control apparatus 17 as a portion of a control program to be executed by the CPU 45 of the front lamp control apparatus 17.

In step ST11, the CPU 45 of the front lamp control apparatus 17 acquires front environment information related to the automobile 1. As illustrated in FIG. 4, the detection control apparatus 16 analyzes, for example, the captured image obtained by the vehicle outside camera 30, and sends, to the front lamp control apparatus 17, the resulting information regarding the kind (the attribute), the relative distance, and the relative direction of the object present in front of the own vehicle. The CPU 45 of the front lamp control apparatus 17 may acquire such control input information from the detection control apparatus 16 as the front environment information related to the automobile 1.

In step ST12, the CPU 45 of the front lamp control apparatus 17 determines whether or not the object for which the anti-glare control is to be performed is present in the application range of the high-beam light sources 72 of the front lamp apparatus 33, based on the front environment information acquired in step ST11. Here, the object for which the anti-glare control is to be performed may be, for example, an object having an attribute of the pedestrian 3, an object having an attribute of the oncoming vehicle 2, or an object having an attribute of the preceding vehicle. If the object for which the anti-glare control is to be performed is present, the CPU 45 causes the process to proceed to step ST13. If the object for which the anti-glare control is to be performed is not present, the CPU 45 causes the process to proceed to step ST14.

In step ST13, the CPU 45 of the front lamp control apparatus 17 starts the anti-glare control in order to suppress application of light to the object for which the anti-glare control is to be performed and that is present in the application range. For example, the CPU 45 generates control output information to turn off the high-beam light sources 72 applying light to the object or reduce the light of the high-beam light source 72 applying light to the object, and to maintain the on state of other high-beam light sources 72. The CPU 45 outputs the generated control output information to the front lamp apparatus 33.

The front lamp apparatus 33 is thus able to prevent application of light to the object for which the anti-glare control is to be performed, while allowing other high-beam light sources 72 to be in the on state. Thereafter, the CPU 45 ends this control.

In step ST14, because the object for which the anti-glare control is to be performed is not present in the application range, the CPU 45 of the front lamp control apparatus 17 executes a process to end the anti-glare control. For example, the CPU 45 generates control output information to turn on all of the high-beam light sources 72, and outputs the generated control output information to the front lamp apparatus 33.

The front lamp apparatus 33 is thus able to allow all of the high-beam light sources 72 to be in the on state. Thereafter, the CPU 45 ends this control.

FIG. 7 is an explanatory diagram of a first field-of-view image 110 for the driver.

FIG. 8 is an explanatory diagram of a second field-of-view image 110 for the driver.

The field-of-view image 110 is a field-of-view image 110 that is to allow for visual recognition by the driver of an automobile 1 (a virtual automobile 120) traveling in a virtual space, and that captures an image of a surrounding region including a region in front of the automobile 1 viewed from the automobile 1.

In a case where the automobile 1 travels on an actual road also, the driver of the automobile 1 visually recognizes a field of view corresponding to the field-of-view image 110 in FIG. 7 or 8 from an inside of the automobile 1 when the front lamp apparatus 33 is in the on state.

Further, the first field-of-view image 110 in FIG. 7 corresponds to a state in which all of the high-beam light sources 72 of the front lamp apparatus 33 are in the on state. In this case, a pedestrian 112 and an oncoming vehicle 111 are present within application ranges 113 and 114 of the high-beam light sources 72, respectively.

In contrast, the second field-of-view image 110 in FIG. 8 corresponds to a state in which some of the high-beam light sources 72 of the front lamp apparatus 33 are in the off state. In this case, the pedestrian 112 and the oncoming vehicle 111 are present outside the application ranges 113 and 114 of the high-beam light sources 72.

For example, when the detection control apparatus 16 extracts the pedestrian 112 and the oncoming vehicle 111 as objects during traveling with the application range of the high-beam light sources 72 in FIG. 7, the CPU 45 of the front lamp control apparatus 17 executes the front lamp anti-glare control in FIG. 6 to switch the application range of the high-beam light sources 72 to that in FIG. 8.

Further, if the objects move out of the application range of the high-beam light sources 72, for example, the CPU 45 of the front lamp control apparatus 17 executes the front lamp anti-glare control in FIG. 6 based on the extraction of the objects by the detection control apparatus 16 during traveling with the application range of the high-beam light sources 72 in FIG. 8, to switch the application range of the high-beam light sources 72 back to that in FIG. 7. The traveling safety of the automobile 1 improves.

In order to allow for favorable execution of such an anti-glare control based on the traveling environment or the like, it is important to improve the degree of completion of a control program and control data of the front lamp anti-glare control to be executed by the CPU 45 of the front lamp control apparatus 17.

It is also important that a control program for the front lamp control apparatus 17 and a control program for the detection control apparatus 16 are programmed to allow for favorable cooperation in an actual vehicle.

For example, it is important that programming is done for the automobile 1 as a whole so as to allow for execution of controls in appropriate conditions and at appropriate timings, and that the programming of the automobile 1 as a whole is done so as to allow for occurrence of appropriate shift changes.

FIG. 9 is an explanatory diagram of an example of a development procedure for the automobile 1.

When newly developing the automobile 1, a developer of a manufacturer first designs a system outline for the automobile 1, and determines control apparatuses and devices to be provided in the automobile 1 (step ST1).

Thereafter, the developer defines a requirement of each of the control apparatuses to be provided in the automobile 1 based on the system outline design for the automobile 1 (step ST2). Further, the developer develops a function of each of the control apparatuses (step ST4). Further, the developer implements a control program for each of the control apparatuses (step ST6).

In course of such development processes, the developer verifies the requirement of each of the control apparatuses, for example, in a meeting such as a review (step ST3), and verifies the function thereof (step ST5). In addition, the developer verifies the implementation at a test site or a test laboratory (step ST8).

If a result of the verification is not favorable, the contents of the requirement definition, the function, and the control program of each of the control apparatuses need to be corrected. In some cases, the contents of the function are corrected based on a result of the verification of the implementation. In addition, for example, a correction regarding devices is sometimes necessary. Such correction processes often require much time and man-hours. This leads to a longer development period. In order to allow for easier verifications and to reduce large-scale corrections, the manufacturer sometimes uses a simulation system such as a SILS (Software In the-Loop Simulation) or a HILS (Hardware In the-Loop Simulation). By programming the requirement definition or creating a program regarding the function and using the simulation system, it is possible to proceed with the development process of the requirement definition and the function of each of the control apparatuses while verifying the requirement definition and the function of each of the control apparatuses. Further, by simulating the control program to be implemented through the use of the simulation system, it is possible to proceed with the development process of the control program while verifying the control program. The use of the simulation system in development may reduce the number of times of actual verifications and corrections of the development results.

Further, if all the verifications are favorably done, the development of the automobile 1 is completed, and the automobile 1 is to be manufactured (step ST8).

Note that the description is provided here mainly regarding development of a control program to be used in a control apparatus. However, the description above also applies to development of hardware to be used in a control apparatus, such as an ASIC or a GPU for a vehicle. The AIC and the GPU for a vehicle are typically developed by defining function combining or the like on a program of a computer apparatus. During the development, the function to be provided in hardware is implemented in a program.

The front lamp control apparatus 17 and the front lamp apparatus 33 are also developed by the developer as a part of such a series of development processes of the automobile 1.

In addition, it is important to allow for execution of a control suitable for its purpose, also regarding the anti-glare control described above. It is desirable that contents, a start timing, an end timing, a degree of control, etc. of the control match the purpose.

Meanwhile, an automobile 1 such as the automobile 1 is provided with many control apparatuses as described above. Therefore, the control apparatuses are basically developed by respective development groups in many cases. In this case, development of the automobile 1 involves the following. Based on designing ideas of each company, standards, social requirements, etc. regarding the automobile 1, each control apparatus is assigned with a function and a specification. A content of a control to be performed by each control apparatus is determined to be suitable for the assigned function and specification. After developing the function and the specification, it is necessary to verify suitability of the developed function and specification to the designing ideas, etc. It is also necessary to develop and verify a control program and control data based on the developed function and specification. Accumulation of such steady works creates an excellent automobile 1. The same can be said in development of the front lamp control apparatus 17.

However, when an attempt is made to improve the degree of completion of the control program and the control data of the control apparatus for the automobile 1 such as the front lamp control apparatus 17, such an attempt easily leads to an enormous amount of work and man-hours for its verifications and corrections.

In particular, an automobile 1 such as the automobile 1 uses not only the front lamp control apparatus 17 but uses many other control apparatuses. Further, the many control apparatuses including the front lamp control apparatus 17 are required to favorably cooperate with each other in the automobile 1 in which they are provided. When an attempt is made to advance, as described above, the control program and the control data of the front lamp control apparatus 17 used in such an advanced and complicated control system 10, and an attempt is also made to improve the degree of completion thereof, such development can lead to a lot of work, which cannot be compared with that in development of an existing front lamp control apparatus 17. The number of times of verifications and corrections can also greatly increase.

In addition, the operation state of the front lamp apparatus 33 has been verified so far as follows. For example, multiple illuminometers 81 are disposed side by side on a road of a test site as illustrated in FIG. 1, and an evaluation is performed based on values measured by the illuminometers 81. Some test sites are outdoor, where the verification process is delayed due to weather. A virtual space allows for avoiding such an influence of weather. Further, in a case of the virtual space, for example, as illustrated in FIG. 5, a virtual illuminometer 74 for each light source may be installed in each of the respective application ranges of the light sources of the front lamp apparatus 33 in the virtual space.

Regarding the development of the automobile 1, it is thus desired to allow for a reduction in effort in the development of the automobile 1 including the development of the front lamp control apparatus 17 to be provided in the automobile 1 to control the front lamp apparatus 33.

FIG. 10 is a configuration diagram of an evaluation simulation system 90 for a control including a front lamp control of the automobile 1, according to the embodiment of the invention.

The evaluation simulation system 90 in FIG. 10 includes the vehicle communication network 18, the information communication network 96, and a synchronous relay apparatus 95. The vehicle communication network 18 and the information communication network 96 are coupled to the synchronous relay apparatus 95.

FIG. 11 is an explanatory diagram of an example of a traveling environment of the virtual automobile 120 that travels in a virtual space based on an operation performed by a driver in the evaluation simulation system 90. The virtual automobile 120 in FIG. 11 corresponds to the automobile 1 in FIG. 1.

Further, the virtual automobile 120 is traveling on a straight road straight along the road, as with the automobile 1 in FIG. 1. In the virtual space, a virtual pedestrian 121 and a virtual oncoming vehicle are present. The virtual pedestrian 121 corresponds to the pedestrian 3. The virtual oncoming vehicle corresponds to the oncoming vehicle 2.

In addition, FIG. 11 illustrates the left high-beam application range 4, the right high-beam application range 5, the left low-beam application range 6, and the right low-beam application range 7 as application ranges of light from a front lamp apparatus of the virtual automobile 120. These are desired to be basically the same as those of the automobile 1. Such application of light allows a driver 99 of the virtual automobile 120 to visually recognize the traveling environment in a traveling direction of the automobile 1 also in the virtual space at night. When the virtual pedestrian 121 or the virtual oncoming vehicle 122 described above is present, the driver 99 of the virtual automobile 120 is thus able to perform an operation to avoid the virtual pedestrian 121 or the virtual oncoming vehicle 122.

The vehicle communication network 18 may be a communication network equivalent to that used in the automobile 1 described above, or may be a general-purpose communication network that is able to be shared by multiple mass-produced automobiles 1. Thus, the vehicle communication network 18 may be used to couple multiple front lamp control apparatuses 17 in the automobile 1. Further, the front lamp control apparatus 17 to be verified is coupled to the vehicle communication network 18. As a result, the evaluation simulation system 90 is able to reproduce, as a coupling state of the front lamp control apparatus 17, an environment equivalent to that of the control system 10 of the automobile 1.

The information communication network 96 is a network different from the vehicle communication network 18. Basically, it is preferable that the information communication network 96 be able to perform communication at a higher speed than the vehicle communication network 18 commonly used in the mass-produced automobile 1. As such an information communication network 96, preferably used is a network compliant, for example, with IEEE (Institute of Electrical and Electronics Engineers) 802.3ab standard or a network having a higher communication capability such as a network compliant, for example, with IEEE 802.3z standard. Note that it seems to be possible to use IEEE 802.3bp for the vehicle communication network 18.

The synchronous relay apparatus 95 is coupled to the vehicle communication network 18 and the information communication network 96. The synchronous relay apparatus 95 relays a packet of information between the vehicle communication network 18 and the information communication network 96. The packet of information is transmitted and received between the vehicle communication network 18 and the information communication network 96. The synchronous relay apparatus 95 is able to relay, for example, information to be communicated between a model calculation apparatus 92 or a monitor image generation apparatus 91 and the front lamp control apparatus 17. The model calculation apparatus 92 and the monitor image generation apparatus 91 will be described later.

In order to pursue a real-time operation, basically, it is preferable that the synchronous relay apparatus 95 be able to perform high-speed processing. The synchronous relay apparatus 95 is thus able to relay information on the vehicle communication network 18 side to the information communication network 96 side with almost no delay, and to relay the information on the information communication network 96 side to the vehicle communication network 18 side with almost no delay.

Further, the use of such a synchronous relay apparatus 95 allows the model calculation apparatus 92 and the monitor image generation apparatus 91 described later to be coupled to the information communication network 96 different from the vehicle communication network 18, instead of being directly coupled to the vehicle communication network 18 to which the front lamp control apparatus 17 is coupled. This makes it possible to increase the speed of communication between the model calculation apparatus 92 and the monitor image generation apparatus 91, without being limited by the vehicle communication network 18. In addition, the information communication network 96 and the vehicle communication network 18 are coupled to the synchronous relay apparatus 95, and the synchronous relay apparatus 95 relays information communicated between the model calculation apparatus 92 or the monitor image generation apparatus 91 and the front lamp control apparatus 17. As a result, it is possible to allow for execution of communication between the model calculation apparatus 92 or the monitor image generation apparatus 91 and the front lamp control apparatus 17 while increasing the speed of the communication between the model calculation apparatus 92 and the monitor image generation apparatus 91.

Further, the evaluation simulation system 90 in FIG. 10 represents a coupling state in a case where a control to be performed by the front lamp control apparatus 17 is verified while the virtual automobile 120 is caused to travel in the virtual space under the operation performed by the driver 99. In this case, the front lamp control apparatus 17, the operation control apparatus 11, and the detection control apparatus 16 may be coupled to the vehicle communication network 18. The operation control apparatus 11 and the detection control apparatus 16 are provided in the virtual automobile 120 together with the front lamp control apparatus 17. The front lamp apparatus 33 to be used for the verification is coupled to the front lamp control apparatus 17. An illuminometer 98 may be disposed in front of the front lamp apparatus 33. The illuminometer 98 is to display a light projection range of the front lamp apparatus 33.

In addition, operation members 21 to 25 of the automobile 1 are coupled to the operation control apparatus 11 as operation members of the virtual automobile 120 to be operated by the driver 99.

Coupled to the detection control apparatus 16 is a vehicle outside camera 105 equivalent to the vehicle outside camera 30 to be provided in the automobile 1 together with the detection control apparatus 16. The vehicle outside camera 105 is provided in the evaluation simulation system 90 in FIG. 10 together with a camera monitor 104 as a camera module 103. In the camera module 103, the vehicle outside camera 105 and the camera monitor 104 are disposed to face each other, for example, in a closed casing. This allows the vehicle outside camera 105 to capture an image of an image displayed on the camera monitor 104.

Further, a camera image generation apparatus 102 is coupled to the camera monitor 104 of the camera module 103. The camera image generation apparatus 102 is also coupled to the monitor image generation apparatus 101. Note that the camera image generation apparatus 102 may be directly coupled to the information communication network 96 to be communicable with the monitor image generation apparatus 101. Such a camera image generation apparatus 102 receives, from the monitor image generation apparatus 101, an image of the virtual space generated by the monitor image generation apparatus 101, for example, the field-of-view image 110. Further, the camera image generation apparatus 102 displays, on the camera monitor 104, the image acquired from the monitor image generation apparatus 101 or a predetermined image based thereon. The vehicle outside camera 105 is thus able to capture an image of the virtual space in front of the automobile 1 equivalent to an image which the driver 99 visually recognizes on the driver monitor 101 and which is a view from the inside of the automobile 1.

Note that when the vehicle outside camera 30 to be provided in the automobile 1 is a stereo camera, the camera module 103 may include two sets each including the vehicle outside camera 105 and the camera monitor 104. In each of the sets in the camera module 103, the vehicle outside camera 105 and the camera monitor 104 may be disposed to face each other. Further, the camera image generation apparatus 102 may generate two images having a predetermined parallax, for example, from the field-of-view image 110 acquired from the monitor image generation apparatus 101, and may cause the two respective camera monitors 104 to separately display the two generated images. The vehicle outside camera 105 is thus able to serve as a stereo camera, as with the vehicle outside camera 30 to be provided in the automobile 1. The two field-of-view images 110 having a parallax may be generated by the monitor image generation apparatus 101.

In addition, for example, other control apparatuses 12 to 15 of the control system 10 illustrated in FIG. 2 may be coupled to the vehicle communication network 18. For example, the traveling control apparatus 12, the driving control apparatus 13, the braking control apparatus 14, and the steering control apparatus 15 may be coupled to the vehicle communication network 18 as the other control apparatuses 12 to 15 indicated by dashed lines in the drawing. In such an evaluation simulation system 90, various control apparatuses that are to be provided in the automobile 1 but are not to be verified are coupled to the vehicle communication network 18, making it possible to create an environment similar to that of an actual vehicle as a communication environment of the vehicle communication network 18 in a simulation.

Here, the driver 99 of the evaluation simulation system 90 may be a developer or a person in charge, for example, at a test laboratory or in an evaluation department other than the developer.

In addition, for example, the monitor image generation apparatus 91, the model calculation apparatus 92, a traveling environment generation apparatus 93, and an event generation apparatus 94 are coupled to the information communication network 96. A computer apparatus may be used as each of these apparatuses. Alternatively, each of the apparatuses may include multiple computer apparatuses. The computer apparatus may include hardware similar to that of the control apparatus 40 in FIG. 3. Note that a CPU of the computer apparatus executing a program allows for implementation of a controller controlling an operation of each of the apparatuses 91 to 94 in the corresponding one of the apparatuses 91 to 94 described above. Such a controller of each of the apparatuses 91 to 94 executes various controls described below.

The model calculation apparatus 92 executes controls of the various control apparatuses to be provided in the automobile 1 as a model control of the virtual automobile 120.

When the automobile 1 is to be caused to travel in the virtual space, it is sufficient that the model calculation apparatus 92 executes at least a control to be performed by a control apparatus that causes the automobile 1 to travel, as the model control of the virtual automobile 120.

In a case of the control system 10 in FIG. 2, it is sufficient that the model calculation apparatus 92 executes at least controls to be performed by the driving control apparatus 13, the braking control apparatus 14, and the steering control apparatus 15, as the model control of the virtual automobile 120.

Note that, the evaluation simulation system 90 according to the present embodiment is to cause the virtual automobile 120 to travel in the virtual space under the operation performed by the driver 99. In this case, the model calculation apparatus 92 executes at least a control to be performed by the operation control apparatus 11 in addition, as the model control of the virtual automobile 120.

Further, when the front lamp apparatus 33 is controlled by the front lamp control apparatus 17 to be evaluated as in an example of the present embodiment, the model calculation apparatus 92 preferably executes at least the control to be performed by the operation control apparatus 11 in addition, as the model control of the virtual automobile 120. Further, when the operation control apparatus 11 receives the output information related to the detection control apparatus 16 as its control input as illustrated in FIG. 4, the model calculation apparatus 92 desirably executes a control to be performed by the detection control apparatus 16 in addition, as the model control of the virtual automobile 120.

As the model control of the virtual automobile 120 described above, for example, a control developed in a stage immediately before in FIG. 9 may be used. For example, in a case of a control program to be implemented, a control that allows for execution of a model in function development may be used. Alternatively, as the model control of the virtual automobile 120, a control that allows for execution of a model of an automobile may be used, or a combination thereof may be used. Here, allowing for execution refers not only to a case of programming the operation itself, but may also refer to, for example, putting an input and output relationship in a table.

In addition, for example, regarding an operation of a driving system such as an engine of the automobile 1, an operation model thereof is assumable. As the operation model of the driving system, for example, a model may be created in which an amount of fuel injection to the engine is calculated based on an operation amount of the accelerator pedal, a combustion reaction in the engine is calculated based on the amount of fuel injection, and an engine output is obtained based on the combustion reaction. The model calculation apparatus 92 may execute such an operation model of the driving system to calculate a speed or an acceleration after an operation is performed on the virtual automobile 120.

Further, the operation model of the driving system is not necessarily based on a highly abstract generalized driving system as described above, and may be a model corresponding to a configuration of a driving system of a specific vehicle type that is to be actually provided in the automobile 1. The operation model corresponding to the configuration of the driving system may be, for example, a combination of a control program of the driving control apparatus 13 to be actually provided in the automobile 1 and an abstract model of the engine 26 to be actually provided in the automobile 1 together therewith. The abstract model of the engine 26 to be actually provided in the automobile 1 may include, for example, a torque generation model in an engine body described above, models of various actuators including, without limitation, an injector, that set an operating condition of the engine 26, and models of various sensors that detect an operating state of the engine 26. In this case, the model calculation apparatus 92 is able to generate control output information related to the driving system of the specific vehicle type to be actually provided in the automobile 1 by executing the control program of the driving control apparatus 13 and by calculating the operations of the multiple models.

Note that the model calculation apparatus 92 may employ a similar operation model for a system other than the driving system.

Further, basically, the model calculation apparatus 92 generates, through calculation, a position and a direction of the virtual automobile 120 in the virtual space after the operation is performed, as a movement of the automobile 1 traveling based on the operation performed by the driver 99 on the operation members 21 to 25. The model calculation apparatus 92 basically generates such a position and a direction of the virtual automobile 120 with use of the information on the vehicle communication network 18 side relayed by the synchronous relay apparatus 95. The model calculation apparatus 92 may generate an attitude or the like of the virtual automobile 120 through calculation. The model calculation apparatus 92 serving as a model calculator is thus able to calculate the movement of the virtual automobile 120 based on the operation performed by the driver 99 on the operation members 21 to 25 by executing the model control of the virtual automobile 120.

Further, the model calculation apparatus 92 may execute, as the model control of the virtual automobile 120, a control to be performed by a control apparatus for the automobile 1 other than those described above, to thereby generate various kinds of information. As illustrated in FIG. 9, at a time when the requirement definition of the control apparatus is to be verified, designing of a vehicle system regarding the automobile 1 as a whole is usually finished before that. For example, at a time when a function of a control apparatus is to be verified, usually, the requirement definition regarding the control apparatus is already finished. Modeling and programming the vehicle system design, the contents of the requirement definition, or the input and output relationship make it possible to obtain various programs to be executed by the model calculation apparatus 92 at a time of verifying the function of the front lamp control apparatus 17. Further, at a time of verifying the control program and the control data of the front lamp control apparatus 17 to be implemented, modeling and programming the function or the input and output relationship of the front lamp control apparatus 17 make it possible to obtain various programs to be executed by the model calculation apparatus 92 at the time of verifying the function of the front lamp control apparatus 17.

The traveling environment generation apparatus 93 generates the virtual space in which the virtual automobile 120 travels. The traveling environment generation apparatus 93 may have data regarding the virtual space in which the virtual automobile 120 travels, and may expand the data to generate the virtual space in which the virtual automobile 120 travels. It is sufficient that the data regarding the virtual space includes at least data of a road on which the virtual automobile 120 travels. For example, the data regarding the virtual space may include road data obtained by sampling an actual road environment, or may include road data virtually set for verification or the like. For example, when verifying actual traveling of the automobile 1 in Japan, it is sometimes difficult to reproduce, in reality, a traveling environment similar to that in another country such as the United States for the verification. In the virtual space, it is also possible to virtually reproduce such a traveling environment for which an actual traveling verification is difficult to perform.

The event generation apparatus 94 generates an event related to the virtual automobile 120 in the virtual space. Examples of the event related to the virtual automobile 120 include traveling of another virtual automobile such as the virtual oncoming vehicle 122, a movement of the virtual pedestrian 121 or a virtual bicycle, and switching of a virtual traffic light or a railroad crossing. The event generation apparatus 94 causes the other virtual automobile, the virtual pedestrian 121, the virtual bicycle, and the like to move along preset moving routes in the virtual space. In addition, the event generation apparatus 94 changes states of the virtual traffic light, the virtual railroad crossing, and the like at preset timings. This allows the virtual automobile 120 to travel in the virtual space in which other virtual movable bodies are moving.

A driver monitor 101 is coupled to the monitor image generation apparatus 91. The driver monitor 101 displays the field-of-view image 110 toward the driver 99. Examples of the field-of-view image 110 include that illustrated in FIG. 7 or 8. The monitor image generation apparatus 91 acquires information from another apparatus coupled to the information communication network 96, and generates the field-of-view image 110 for the driver 99 of the virtual automobile 120 traveling in the virtual space based on the acquired information.

For example, the monitor image generation apparatus 91 places another mobile body in the virtual space. The other mobile body is generated by the event generation apparatus 94. The virtual space is generated by the traveling environment generation apparatus 93. In addition, the monitor image generation apparatus 91 maps, on a two-dimensional plane, the virtual space in which the other mobile body is placed, to thereby generate the field-of-view image 110. The monitor image generation apparatus 91 performs such mapping based on the position and the direction of the virtual automobile 120 after the operation generated by the model calculation apparatus 92. For example, when the virtual pedestrian 121 and the virtual oncoming vehicle 122 generated by the event generation apparatus 94 are present in front of the virtual automobile 1201 as illustrated in FIG. 7, 8, or 11, the field-of-view image 110 is to include an image of the virtual pedestrian 121 and an image of the virtual oncoming vehicle 122.

As described above, the monitor image generation apparatus 91 serving as a monitor image generator calculates at least the position and the direction of the virtual automobile 120 after the virtual automobile 120 moves in the virtual space, and generates the field-of-view image 110 after the virtual automobile 120 moves. The position and the direction of the virtual automobile 120 are based on the movement of the virtual automobile 120 calculated by the model calculator. Further, the driver monitor 101 displays, with respect to the driver 99, the field-of-view image 110 from the virtual automobile 120 that is traveling in the virtual space.

Further, the evaluation simulation system 90 performs the various processes described above, for example, within a time of a control cycle of the control system 10 of the virtual automobile 120. The control cycle of the virtual automobile 120 may be the same as a control cycle of the automobile 1, for example. The evaluation simulation system 90 is thus able to continuously update the field-of-view image 110 on the driver monitor 101 without causing a great delay with respect to the operation performed by the driver 99. The evaluation simulation system 90 is able to simulate, on a real-time basis, the movement of the virtual automobile 120 in the virtual space under the operation performed by the driver 99.

Upon the development of the automobile 1, the evaluation simulation system 90 is favorably usable for a verification of the requirement definition of each of the control apparatuses including, without limitation, the front lamp control apparatus 17 to be provided in the automobile 1, a verification of the function thereof, a verification of the control program and control data thereof, etc. It is thus expectable that the load on the developer in verification processes is markedly reduced. It is also expectable that the developed control to be performed by each of the control apparatuses has a high degree of completion suitable to the vehicle system design. Accuracy in design may markedly improve.

Next, a more detailed description is provided of a case where the evaluation simulation system 90 is used to verify the front lamp control apparatus 17.

As illustrated in FIG. 7 or 8, when the front lamp control apparatus 17 turns on the front lamp apparatus 33, the field-of-view image 110 displayed on the driver monitor 101 includes the application range of the light from the front lamp apparatus 33. Accordingly, when the traveling environment of the automobile 1 is to be reproduced to give the driver 99 a sense of realism, the field-of-view image 110 is desirably changed in accordance with the operation state of the front lamp apparatus 33. In addition, changing of the field-of-view image 110 in accordance with the operation state of the front lamp apparatus 33 in such a manner makes it possible to use the field-of-view image 110 itself to verify a state of the control of the front lamp apparatus 33 performed by the front lamp control apparatus 17.

To achieve the above, it is necessary to cause the model calculation apparatus 92 to execute the model control of the front lamp control apparatus 17, and the monitor image generation apparatus 91 needs to generate the field-of-view image 110 reflecting a result of the executed model control of the front lamp control apparatus 17.

Meanwhile, to execute the control, the front lamp control apparatus 17 needs to acquire the control input information from the detection control apparatus 16 or the like, as the above-described example illustrated in FIG. 4.

Note that, together with the above, the front lamp control apparatus 17 may acquire the control input information necessary for executing the control directly from another control apparatus coupled to the vehicle communication network 18. For example, the operation control apparatus 11 may directly output, to the front lamp control apparatus 17, detection amounts of a steering wheel angle based on an operation performed on the steering wheel 21, an accelerator position based on an operation performed on the accelerator pedal 22, and the like, and the front lamp control apparatus 17 may acquire the detection amounts. However, in the drawing, the detection control apparatus 16 is not coupled to the vehicle communication network 18. An insufficient portion of the input information for the front lamp control apparatus 17 to execute the control has to be generated by a model control performed by the model calculation apparatus 92.

The model calculation apparatus 92 is able to acquire the field-of-view image 110 reflecting the calculation result from the monitor image generation apparatus 91, and to execute a model control of the detection control apparatus 16. In addition, the model calculation apparatus 92 is able to use a result of the model control of the detection control apparatus 16 as the control input information related to the front lamp control apparatus 17, to thereby execute the model control of the front lamp control apparatus 17. The use of this allows the monitor image generation apparatus 91 to generate the field-of-view image 110 reflecting the model control of the detection control apparatus 16.

Although the control described here may seem to work, it is actually failing. That is, a timing when the monitor image generation apparatus 91 generates the control output information of the front lamp control apparatus 17 by the model controls of the detection control apparatus 16 and the front lamp control apparatus 17 does not match and is completely delayed from a timing when the position of the virtual automobile 120 and the like are generated by the model control of traveling of the virtual automobile 120. As a result, the monitor image generation apparatus 91 is able to reflect, only in the next field-of-view image 110, the control output information generated by the model control of the front lamp control apparatus 17 based on the field-of-view image 110. The field-of-view image 110 generated under such processing cannot be an image properly displaying the application range that is a result of the model control of the front lamp control apparatus 17 at the timing of the field-of-view image 110. The field-of-view image 110 cannot be an appropriate image as an image to be displayed for the driver 99 or to be used as a reference of a verification. Thus, the processing described above degrades a real-time performance of the simulation performed by the evaluation simulation system 90.

To address the above, in the present embodiment, additional processes are provided for the monitor image generation apparatus 91 and the model calculation apparatus 92 in order to generate and use a traveling environment image prior to the field-of-view image 110.

FIG. 12 is a timing chart of a process for generating the traveling environment image prior to the field-of-view image 110 in the evaluation simulation system 90 in FIG. 10.

FIG. 12 illustrates the monitor image generation apparatus 91, the model calculation apparatus 92, the synchronous relay apparatus 95, and the front lamp control apparatus 17 as the configuration of the evaluation simulation system 90. In the drawing, the time elapses from top to bottom.

In step ST21, the monitor image generation apparatus 91 generates the traveling environment image prior to generation of the field-of-view image 110.

Here, unlike the field-of-view image 110, the traveling environment image may be an image cut out of the virtual space not including the application of the light from the front lamp apparatus 33 controlled by the front lamp control apparatus 17. In this case, the monitor image generation apparatus 91 generates the traveling environment image cut out of the virtual space generated by the traveling environment generation apparatus 93, with reference to the position and the direction of the virtual automobile 120 generated by the model calculation apparatus 92. If the pedestrian 112 or the oncoming vehicle 111 moving in the virtual space is present, the traveling environment image includes an image of such an object. The monitor image generation apparatus 91 serving as the monitor image generator is thus able to generate the traveling environment image including no illuminance caused by the control output of the front lamp control apparatus 17.

In step ST22, the monitor image generation apparatus 91 sends the generated traveling environment image to the model calculation apparatus 92 via the information communication network 96. Further, the model calculation apparatus 92 receives the traveling environment image sent by the monitor image generation apparatus 91 from the information communication network 96.

In step ST23, the model calculation apparatus 92 analyzes the received traveling environment image, and extracts a virtual object included in the traveling environment image.

In step ST24, the model calculation apparatus 92 calculates a relative position and a relative direction of the extracted virtual object with respect to the own vehicle. In the traveling environment image, an image of the virtual object may be captured at a part based on the relative position and the relative direction with respect to the own vehicle. The model calculation apparatus 92 is able to calculate the relative position and the relative direction of the extracted virtual object with respect to the own vehicle, based on a position at which the image of the virtual object is captured in the traveling environment image.

In the processes of step ST23 and step ST24, the model calculation apparatus 92 executes the model control of the detection control apparatus 16 based on the captured image obtained by the vehicle outside camera 30 to thereby generate information regarding the virtual object.

By the processes in step ST23 and step ST24, the model calculation apparatus 92 serving as the model calculator executes a process similar to a process to be executed by the detection control apparatus 16 in the automobile 1 on the captured image obtained by the vehicle outside camera 30. The model calculation apparatus 92 is thus able to generate the control input information related to the front lamp control apparatus 17 which the detection control apparatus 16 outputs to the front lamp control apparatus 17.

In step ST25, the model calculation apparatus 92 executes the model control of the front lamp control apparatus 17. The model calculation apparatus 92 uses the information regarding the virtual object generated in the processes up to step ST24, as the control input information related to the front lamp control apparatus 17, to thereby execute the model control of the front lamp control apparatus 17. As a result, the model calculation apparatus 92 generates the control output information which the front lamp control apparatus 17 outputs to the front lamp apparatus 33.

In the processes in step ST25, the model calculation apparatus 92 serving as the model calculator executes a process similar to a process to be executed by the front lamp control apparatus 17 in the automobile 1 based on its control input. The model calculation apparatus 92 is thus able to generate the control output information which the front lamp control apparatus 17 outputs to the front lamp apparatus 33.

In step ST26, the model calculation apparatus 92 sends the control input information related to the front lamp control apparatus 17 generated based on the traveling environment image to the monitor image generation apparatus 91 via the information communication network 96. The monitor image generation apparatus 91 receives the control input information related to the front lamp control apparatus 17 generated by the model calculation apparatus 92 from the information communication network 96.

In step ST27, the monitor image generation apparatus 91 corrects luminance of the traveling environment image generated in step ST21, based on the control input information related to the front lamp control apparatus 17 generated by the model calculation apparatus 92. The monitor image generation apparatus 91 adjusts luminance of the range to which the front lamp apparatus 33 applies light based on the control input information related to the front lamp control apparatus 17 in the traveling environment image, based on the amount of light from the front lamp apparatus 33. This allows the monitor image generation apparatus 91 to generate an image in which the application range of the light outputted from the front lamp apparatus 33 is brighter than other parts. This image is usable as the field-of-view image 110.

Note that the monitor image generation apparatus 91 may execute the process in step ST21 together with the process in step ST27 to generate the field-of-view image 110 including the application of light from the front lamp apparatus 33, instead of correcting the luminance of the traveling environment image. However, the use of the traveling environment image already generated for the same field-of-view range may reduce a load in the process in step ST27 to be performed by the monitor image generation apparatus 91.

In step ST28, the monitor image generation apparatus 91 displays the generated field-of-view image 110 on the driver monitor 101. This allows the driver 99 operating the operation members 21 to 25 to visually recognize the field-of-view image 110 including the application of light from the front lamp apparatus 33, as a result of the performed operation.

As described above, the monitor image generation apparatus 91 serving as the monitor image generator is able to acquire the control output information related to the front lamp control apparatus 17 calculated by the model calculation apparatus 92, instead of the control output of the front lamp control apparatus 17 to be verified, generate the field-of-view image 110 under the illumination by the front lamp control apparatus 17, and cause the driver monitor 101 to display the field-of-view image 110.

In step ST29, the monitor image generation apparatus 91 calculates illuminance of the virtual object based on the luminance of the virtual object in the generated field-of-view image 110. For example, the monitor image generation apparatus 91 identifies a part of an image of the virtual object in the generated field-of-view image 110, and further, extracts luminance of pixels within the identified outline range of the image of the virtual object. Further, the monitor image generation apparatus 91 calculates, for example, an average value of luminance values of the extracted luminance of the pixels, and calculates the illuminance of the virtual object from the average luminance value.

For example, the field-of-view image 110 in FIG. 7 includes the virtual pedestrian 121 corresponding to the pedestrian 112, and the virtual oncoming vehicle 122 corresponding to the oncoming vehicle 111. In this case, the monitor image generation apparatus 91 may identify a range 116 including the image of the virtual pedestrian 121 in the field-of-view image 110, and may calculate illuminance of the virtual pedestrian 121, which is the object, from luminance values of luminance of pixels within the identified range 116. In addition, the monitor image generation apparatus 91 may identify a range 115 including the image of the virtual oncoming vehicle 122 in the field-of-view image 110, and may calculate illuminance of the virtual oncoming vehicle 122, which is the object, from luminance values of luminance of pixels within the identified range 115.

The monitor image generation apparatus 91 serving as the monitor image generator is thus possible to calculate the illuminance of the virtual object moving around the virtual automobile 120 in the virtual space, based on the luminance of the object in the field-of-view image 110 to be displayed on the driver monitor 101. By executing the process in step ST29 after the processes in step ST23 and step ST24, the monitor image generation apparatus 91 of the evaluation simulation system 90 is able to calculate the illuminance of the virtual object that moves around the virtual automobile 120 in the virtual space.

In step ST31, the monitor image generation apparatus 91 sends the field-of-view image 110 generated in step ST27 to the camera image generation apparatus 102. The camera image generation apparatus 102 displays the field-of-view image 110 or an image based thereon on the camera monitor 104 of the camera module 103. Thus, the vehicle outside camera 105 of the camera module 103 captures an image of the field-of-view image 110 or the image based thereon, and outputs the captured image to the detection control apparatus 16.

In step ST32, the detection control apparatus 16 executes the control program 51 thereof to analyze the captured image obtained by the vehicle outside camera 105 and extract the virtual object included in the captured image. In addition, the detection control apparatus 16 calculates a relative position and a relative distance of the extracted virtual object with respect to the own vehicle.

In step ST33, the detection control apparatus 16 sends the information regarding the extracted virtual object included in the field-of-view image 110 to the front lamp control apparatus 17 via the vehicle communication network 18. The front lamp control apparatus 17 receives the information regarding the virtual object that is usable as the control input information from the detection control apparatus 16 via the vehicle communication network 18. As with in the case where the front lamp control apparatus 17 is provided in the automobile 1, the front lamp control apparatus 17 is able to receive the control input information for the control from the vehicle communication network 18.

In step ST34, the front lamp control apparatus 17 executes, for example, the front lamp control based on the control program and the control data. The front lamp control apparatus 17 executes the front lamp anti-glare control in FIG. 6 as one front lamp control.

Further, the front lamp control apparatus 17 outputs the control output information to the front lamp apparatus 33 as a result of the front lamp control such as the front lamp anti-glare control in FIG. 6. The front lamp apparatus 33 controls turning-on of the light sources based on the control output information generated by the front lamp control apparatus 17. The illuminometer 98 displays an application pattern of light corresponding to the operation state of the front lamp apparatus 33.

As described above, as in the case where the detection control apparatus 16 is provided in the automobile 1, the detection control apparatus 16 sends the generated control input information to the front lamp control apparatus 17. In addition, the front lamp control apparatus 17 is able to execute a control based on a control program developed for the front lamp control apparatus 17 in association with the simulation of the front lamp control performed by the evaluation simulation system 90, and to cause the front lamp apparatus 33 to operate in association therewith.

If the control program and the control data are developed with high quality to favorably match the mode control of the front lamp control apparatus 17, the application pattern of the light from the front lamp apparatus 33 may favorably match the application range in the field-of-view image 110. A temporal change in the application pattern of the light and a temporal change in the application range in the field-of-view image 110 may also differ from each other.

In contrast, if the quality of the control program and the control data is insufficient, the application pattern of the light from the front lamp apparatus 33 differs from the application range in the field-of-view image 110. In addition, the temporal change in the application pattern of the light and the temporal change in the application range in the field-of-view image 110 may also favorably match each other.

The developer is able to correct the control program and the control data to improve the quality of the control program and the control data by comparing them to perform a verification.

As described above, in the present embodiment, it is possible to cause the front lamp control apparatus 17 to perform a simulation operation under the control in which the virtual automobile 120 corresponding to the automobile 1 travels in the virtual space under the operation performed by the driver 99. Using such an evaluation simulation system 90 in developing the control to be performed by the front lamp control apparatus 17 makes it possible to improve the degree of completion of the control to be performed by the front lamp control apparatus 17. In addition, the operation simulation of the front lamp control apparatus 17 is performed under the control in which the virtual automobile 120 travels in the virtual space under the operation performed by the driver 99. It is therefore expectable that the operation simulation is reliable and close to a result of an operation confirmation or a verification in a case where the front lamp control apparatus 17 is actually provided in the automobile 1. The use of the evaluation simulation system 90 of the present embodiment may effectively reduce the effort in developing the front lamp control apparatus 17 to be provided in the automobile 1 to control the front lamp apparatus 33 of the automobile 1.

In addition, the detection control apparatus 16 used in the evaluation simulation system 90 for the control including the front lamp control of the automobile 1 extracts, based on the captured image obtained by the vehicle outside camera 105 in the camera module 103, the virtual object for which a light distribution control is to be performed, outputs the information regarding the virtual object to the front lamp control apparatus 17, and causes the front lamp control apparatus 17 to operate. The virtual object is present around the virtual automobile 120 that is traveling in the virtual space. In the evaluation simulation system 90 of the present embodiment, in a state where the front lamp control apparatus 17 and the detection control apparatus 16 to be provided in the automobile 1 together therewith are coupled to the vehicle communication network 18 and are in association with each other, the front lamp control apparatus 17 is able to execute the control. The evaluation simulation system 90 of the present embodiment is not only able to perform an operation confirmation and a verification of the front lamp control apparatus 17 alone, but is also able to perform an operation confirmation and a verification of a control in which the front lamp control apparatus 17 and the detection control apparatus 16 are in association with each other. It is possible to perform the operation confirmation and the verification, in an environment close to that of an actual vehicle, of the control to be performed by the front lamp control apparatus 17 including association with another control apparatus.

In addition, the model calculation apparatus 92 of the evaluation simulation system 90 for the control including the front lamp control of the automobile 1 calculates the movement of the virtual automobile 120 based on the operation performed by the driver 99 on the operation members 21 to 25. In addition, the model calculation apparatus 92 generates the control input information and the control output information related to the front lamp control apparatus 17 by executing the model control of the virtual automobile 120, and outputs the control input information to the front lamp control apparatus 17 to cause the front lamp control apparatus 17 to operate in association. In addition, the monitor image generation apparatus 91 is able to acquire the control output information related to the front lamp control apparatus 17 calculated by the model calculation apparatus 92, instead of the control output of the front lamp control apparatus 17, generate the field-of-view image 110 under the illumination by the front lamp control apparatus 17, and cause the driver monitor 101 to display the field-of-view image 110. With the field-of-view image 110 on the driver monitor 101 that changes in accordance with the operation performed by the driver 99 allows the driver 99 to recognize the movement of the virtual automobile 120 while having a sense of driving the actual automobile 1, and to operate the operation members 21 to 25 of the operation simulation without having any sense of strangeness.

In contrast, for example, in an assumed case where the monitor image generation apparatus 91 acquires the control output of the front lamp control apparatus 17 in development and generates the field-of-view image 110 under the illumination by the front lamp control apparatus 17, the monitor image generation apparatus 91 is not able to generate the field-of-view image 110 if the monitor image generation apparatus 91 fails to acquire the control output from the front lamp control apparatus 17 in development. For example, in a case where the front lamp control apparatus 17 in development fails to output the control result, or in a case where the front lamp control apparatus 17 in development is able to output the control result only with a delay from the operation performed by the driver 99, the monitor image generation apparatus 91 is not able to generate, when the operation is performed by the driver 99, the field-of-view image 110 reflecting the operation immediately after the operation is performed by the driver 99. Further, in a case where the control output is acquired from the front lamp control apparatus 17, a delay in control increases. In the present embodiment, the control output information related to the front lamp control apparatus 17 calculated by the model calculation apparatus 92 is acquired. Therefore, a real-time loop process of such a traveling control loop involving the driver 99 is not inhibited. The evaluation simulation system 90 is able to allow the virtual automobile 120 to travel in the virtual space under the operation performed by the driver 99 and to allow the front lamp control apparatus 17 to execute a control while the virtual automobile 120 is traveling, independently of whether the control of the front lamp control apparatus 17 is appropriate or not. The evaluation simulation system 90 is able to execute the real-time simulation without being influenced by whether or not the control of the front lamp control apparatus 17 is appropriate or by any delay.

In particular, in the present embodiment, the monitor image generation apparatus 91 not only generates the field-of-view image 110 to be displayed on the driver monitor 101, but also generates the traveling environment image not including the illuminance derived from the control output of the front lamp control apparatus 17 in addition. Further, the model calculation apparatus 92 uses the traveling environment image to execute the model control of the virtual automobile 120, and thereby generates the control input information and the control output information related to the front lamp control apparatus 17. The generated control input information is outputted to the front lamp control apparatus 17, and is used for the operation of the front lamp control apparatus 17. This makes it unnecessary for the front lamp control apparatus 17 to wait for generation of the field-of-view image 110 by the monitor image generation apparatus 91. The traveling environment image generatable before that is generated, allowing for the front lamp control apparatus 17 to acquire the control input information and execute the control.

In contrast, for example, in an assumed case where the model calculation apparatus 92 uses the field-of-view image 110 generated by the monitor image generation apparatus 91 to execute the model control of the virtual automobile 120, and thereby generates the control input information and the control output information related to the front lamp control apparatus 17, the timing when the front lamp control apparatus 17 acquires the control input information is delayed. The operation of the front lamp control apparatus 17 is delayed with respect to the operation of the evaluation simulation system 90. In the present embodiment, such a delay is reduced, and it is possible to allow the front lamp control apparatus 17 to operate in synchronization with the operation of the evaluation simulation system 90.

In the present embodiment, the monitor image generation apparatus 91 calculates the illuminance of the virtual object moving around the virtual automobile 120 in the virtual space, based on the luminance of the object in the field-of-view image 110 to be displayed on the driver monitor 101. This allows the evaluation simulation system 90 to evaluate the illuminance caused by the front lamp apparatus 33 under the control performed by the front lamp control apparatus 17, as in a case of verifying the front lamp control apparatus 17 in an actual vehicle with use of an illuminometer.

In addition, the illuminance calculated in the present embodiment is not obtained by a virtual illuminometer fixed in the virtual space, but is related to the object moving in the virtual space. This makes it possible to evaluate whether the control by the front lamp control apparatus 17, which is able to switch the application range by a control such as light reduction, is able to cause the light to be applied so that desired illuminance is obtained regarding the moving object. In a verification of an actual vehicle, it is not easy to detect illuminance of such a moving object.

Second Embodiment

Next, a second embodiment of the invention will be described. In the present embodiment, configurations similar to those in the above-described embodiment are denoted with the same reference numerals, and illustrations and descriptions thereof are omitted to mainly describe differences between the present embodiment and the above-described embodiment.

FIG. 13 is a configuration diagram of the evaluation simulation system 90 for a control including the front lamp control of the automobile 1, according to the second embodiment of the invention.

In the evaluation simulation system 90 in FIG. 13, a monitor image generation apparatus 140 and the model calculation apparatus 92 are coupled to the information communication network 96.

The monitor image generation apparatus 140 includes an event generator 141, a traveling environment generator 142, a monitor image generator 143, and an object information acquirer 144.

As with the event generation apparatus 94 described above, the event generator 141 in the monitor image generation apparatus 140 generates an event related to the virtual automobile 120 in the virtual space.

As with the traveling environment generation apparatus 93 described above, the traveling environment generator 142 in the monitor image generation apparatus 140 generates the virtual space in which the virtual automobile 120 travels.

As with the monitor image generation apparatus 91 described above, the monitor image generator 143 in the monitor image generation apparatus 140 generates the field-of-view image 110 and causes the field-of-view image 110 to be displayed on the driver monitor 101.

The object information acquirer 144 acquires information regarding the object generated in the series of processes up to the generation of the field-of-view image 110 performed by the monitor image generation apparatus 140, and sends the acquired information regarding the object to the model calculation apparatus 92.

FIG. 14 is a timing chart of a control up to the generation of the field-of-view image to be performed in the evaluation simulation system 90 in FIG. 13.

In the present embodiment, the control in FIG. 14 is executed, instead of that in FIG. 12.

FIG. 14 illustrates the monitor image generation apparatus 140, the model calculation apparatus 92, the synchronous relay apparatus 95, and the front lamp control apparatus 17 as the configuration of the evaluation simulation system 90. In the drawing, time elapses from top to bottom.

In addition, processes similar to those in FIG. 12 are denoted with the same reference numerals, and descriptions thereof are omitted.

In step ST51, the monitor image generation apparatus 140 serving as the event generator 141 generates an event related to the virtual automobile 120 in the virtual space, prior to the generation of the field-of-view image 110.

In step ST52, the monitor image generation apparatus 140 serving as the traveling environment generator 142 generates the virtual space in which the virtual automobile 120 travels.

Here, the monitor image generation apparatus 140 generates the virtual space in which an object such as the virtual oncoming vehicle 122 generated as an event in step ST51 is disposed.

In step ST53, the monitor image generation apparatus 140 serving as the object information acquirer 144 acquires information regarding an object such as the oncoming vehicle 122 present in the virtual space in which the virtual automobile 120 travels.

The object such as the oncoming vehicle 122 generated as the event in step ST51 is assigned to the virtual space generated in step ST52.

For example, the monitor image generation apparatus 140 may acquire position information related to the object in the virtual space, based on the virtual space generated in step ST52.

Further, when the information regarding the position and the direction of the virtual automobile 120 has been acquired from the model calculation apparatus 92, the monitor image generation apparatus 140 may estimate the position and the direction of the virtual automobile 120 in the virtual space based on the acquired information, and may acquire relative position information related to the object with respect to the virtual automobile 120 in the virtual space.

In step ST54, the monitor image generation apparatus 140 serving as the object information acquirer 144 sends the information regarding the object acquired in step ST53 to the model calculation apparatus 92 via the information communication network 96.

Such acquisition of the information regarding the object allows the model calculation apparatus 92 to start the front lamp anti-glare control in step ST25 immediately after the acquisition of the information regarding the object.

Thereafter, the model calculation apparatus 92 sends the generated control input information related to the front lamp control apparatus 17 to the monitor image generation apparatus 140 via the information communication network 96. The monitor image generation apparatus 140 receives the control input information related to the front lamp control apparatus 17 generated by the model calculation apparatus 92 from the information communication network 96.

In step ST55, the monitor image generation apparatus 140 serving as the monitor image generator 143 generates the field-of-view image 110 including the application of the light from the front lamp apparatus 33.

Processes after this are similar to those in FIG. 12.

As described above, the monitor image generation apparatus 140 of the present embodiment executes the control performed as the monitor image generator 143 generating the field-of-view image 110, and also executes the controls performed as the event generator 141 and the traveling environment generator 142 prior thereto. The monitor image generation apparatus 140 is thus able to execute the process of generating the virtual space including the virtual object, and to generate the position information related to the virtual object moving in the virtual space.

Further, the monitor image generation apparatus 140 acquires the information regarding the object generatable in the series of controls, and sends the acquired information to the model calculation apparatus 92. The model calculation apparatus 92 serving as the model calculator is thus able to generate the control input information and the control output information related to the front lamp control apparatus 17 by executing the model control of the virtual automobile 120 with use of the position information related to the virtual object generated by the monitor image generation apparatus 140. In addition, the model calculation apparatus 92 is able to start the front lamp anti-glare control in step ST25 without analyzing the traveling environment image or generating the information regarding the object by itself as in the above-described embodiment.

Further, the series of controls executed by the monitor image generation apparatus 140 as the event generator 141, the traveling environment generator 142, and the monitor image generator 143 are controls fundamentally necessary to execute the evaluation simulation. Accordingly, a reduction in the processes performed by the model calculation apparatus 92 reduces the delay caused by the control in FIG. 14, as compared with the case of the above-described embodiment. It is possible to reduce an influence on real-timeness regarding the control performed by the evaluation simulation system 90, as compared with the case of the above-described embodiment.

Further, in the present embodiment, as illustrated in FIG. 13, the apparatus coupled to the information communication network 96 is divided into two, i.e., into the monitor image generation apparatus 140 and the model calculation apparatus 92. This makes it possible to optimize each of the apparatuses.

For example, as the monitor image generation apparatus 140, it is possible to employ a high-performance computer apparatus that has a function such as that of a GPU or parallel computing and is able to perform large-capacity processing.

Further, as the model calculation apparatus 92, it is possible to employ a rapid CPU or the like that is able to complete the processing within a certain time. It is thus possible to employ a computer apparatus having real-timeness that ensures synchronicity between the various control apparatuses coupled to the vehicle communication network 18 and the model calculation apparatus 92.

Configuring the evaluation simulation system 90 with such a combination of apparatuses makes it possible for the evaluation simulation system 90 to execute an advanced control state of the automobile 1 on a real-time basis with use of the virtual space.

Third Embodiment

Next, a third embodiment of the invention will be described. In the present embodiment, configurations similar to those in the above-described embodiments are denoted with the same reference numerals, and illustrations and descriptions thereof are omitted to describe mainly differences between the present embodiment and the above-described embodiments.

The description of the present embodiment is applicable as a modification of each of the above-described embodiments.

FIG. 15 is an explanatory diagram of a third field-of-view image 110 for the driver 99, to describe a process of acquiring the illuminance of the object in the evaluation simulation system 90 according to the third embodiment of the invention.

In the third field-of-view image 110 for the driver 99 in FIG. 15, sections 117 are set corresponding thereto. The sections 117 result from dividing the entire third field-of-view image 110.

Note that the sections 117 may be set by dividing a portion of the third field-of-view image 110. For example, the sections 117 may be set by dividing the ranges 113 and 114 to which the front lamp apparatus 33 is applying light.

The monitor image generation apparatus 91 of the present embodiment uses such sections 117 to execute an illuminance calculation process related to the virtual objects 121 and 122 based on the luminance in the field-of-view image 110 in step ST29 in FIG. 12.

Specifically, the monitor image generation apparatus 91 first divides the entire field-of-view image 110, which is generated by correcting the luminance, into the sections 117.

Thereafter, the monitor image generation apparatus 91 calculates illuminance of each of the sections 117, based on luminance of one or more pixels included in each of the sections 117.

Thereafter, the monitor image generation apparatus 91 identifies a position range of images of the virtual objects 121 and 122 in the field-of-view image 110. The monitor image generation apparatus 91 further identifies one or more sections 117 including the identified images of the virtual objects 121 and 122. Here, the sections 117 overlapping with the images of the virtual objects 121 and 122 may be regarded as the sections 117 including the images of the virtual objects 121 and 122. The sections 117 not overlapping with the images of the virtual objects 121 and 122 may be regarded as the sections 117 not including the images of the virtual objects 121 and 122. In this case, the monitor image generation apparatus 91 determines the overlapping of the positions of the images of the virtual objects 121 and 122 and the position of each of the sections 117 in the field-of-view image 110. The monitor image generation apparatus 91 is thus able to identify all the sections 117 that overlap with the images of the virtual objects 121 and 122 in the field-of-view image 110. The number of times of repeatedly performing the processes in this case is reduced, as compared with a case where each of the pixels of the images of the virtual objects 121 and 122 is identified from the field-of-view image 110.

Thereafter, the monitor image generation apparatus 91 calculates an average value of the illuminance for each of the sections 117, regarding the one or more identified sections 117 including the images of the virtual objects 121 and 122, to thereby acquire illuminance of the virtual objects 121 and 122. The illuminance of each of the sections 117 is calculated in advance.

This makes it unnecessary for the monitor image generation apparatus 91 to execute the process repeatedly for the number of times corresponding to the number of pixels in the field-of-view image 110, unlike in a case where pixels overlapping with the images of the virtual objects 121 and 122 are selected from the field-of-view image 110. When the field-of-view image 110 includes multiple virtual objects 121 and 122 also, it is possible to simplify the process of obtaining the illuminance of each of the objects, allowing for a reduction in a total processing time. The monitor image generation apparatus 91 is able to execute the process in step ST29 in FIG. 12 within a time that is reducible.

As a result, in the present embodiment, it is expectable to suppress an increase in a period from the generation of the traveling environment image in step ST21 in FIG. 12 to the generation of the field-of-view image 110 in step ST27, and to thereby allow such a period to fall within a desired period. For example, even if the number of the virtual objects 121 and 122 moving in the virtual space is increased, it is possible to reduce a delay in the process related to the traveling environment image in FIG. 12, and to thereby maintain the real-timeness of the simulation performed by the evaluation simulation system 90.

As described above, in the present embodiment, the monitor image generation apparatus 91 divides the field-of-view image 110 to be displayed on the driver monitor 101 into the sections 117, and uses the luminance of each of the sections 117 to calculate the luminance of the virtual objects 121 and 122 in the field-of-view image 110. A load on the process, performed by the monitor image generation apparatus 91, for calculating the illuminance of the virtual objects 121 and 122 is reduced.

In the present embodiment, even when the evaluation simulation system 90 is caused to additionally perform the process of obtaining the illuminance of the virtual objects 121 and 122, it is possible to prevent easy occurrence of a delay in the control due to the process. In the present embodiment, it may be possible to prevent degradation of the real-time simulation performed by the evaluation simulation system 90.

In addition, the above-described sections 117 into which the field-of-view image 110 is divided may be able to virtually achieve a state where illuminometers are arranged two-dimensionally.

The embodiments described above are favorable examples of an embodiment of the invention. However, the invention is not limited to those, and various modifications and alternations may be made without departing from the scope of the gist of the invention.

For example, in the embodiments described above, the description is provided with reference to the case where the evaluation simulation system 90 is used to verify the front lamp control apparatus 17 in development, as an example.

In addition to this, the evaluation simulation system 90 may be used to verify a control apparatus other than the front lamp control apparatus 17 to be provided in the automobile 1. The evaluation simulation system 90 is able to perform an operation simulation under a control in which the virtual automobile 120 corresponding to the automobile 1 travels in the virtual space under the operation performed by the driver 99, for the control apparatus other than the front lamp control apparatus 17 to be provided in the automobile 1.

In addition, the control apparatus verifiable with use of the evaluation simulation system 90 is not limited to a control apparatus for the automobile 1 in development. For example, the evaluation simulation system 90 is usable to verify a control apparatus such as the front lamp control apparatus 17 provided in an actual vehicle already on sale.

In the embodiments described above, the model calculation apparatus 92 of the evaluation simulation system 90 executes a model calculation with use of the already-created design resource for the automobile 1 in development.

In addition to this, for example, a manufacturer of the automobile 1 or an evaluation organization also has design resources for other already-developed automobiles. The model calculation apparatus 92 may use such already-created design resources for the other automobiles to execute the mode calculation.

Moreover, in addition to the above, for example, the model calculation apparatus 92 may execute the program not for an actual vehicle to be put into practical use but for a virtually defined model vehicle to execute the model calculation.

DESCRIPTION OF REFERENCE NUMERALS

1 . . . automobile (vehicle), 2 . . . oncoming vehicle, 3 . . . pedestrian, 4 . . . left high-beam application range, 5 . . . right high-beam application range, 6 . . . left low-beam application range, 7 . . . right low-beam application range, 10 . . . control system, 11 . . . operation control apparatus, 12 . . . traveling control apparatus, 13 . . . driving control apparatus, 14 . . . braking control apparatus, 15 . . . steering control apparatus, 16 . . . detection control apparatus, 17 . . . front lamp control apparatus, 18 . . . vehicle communication network, 21 . . . steering wheel (operation member), 22 . . . accelerator pedal (operation member), 23 . . . brake pedal (operation member), 24 . . . shift lever (operation member), 25 . . . touch panel (operation member), 26 . . . engine, 27 . . . transmission, 28 . . . brake apparatus, 29 . . . steering apparatus, 30 . . . vehicle outside camera, 31 . . . . Lidar, 32 . . . laser apparatus, 33 . . . front lamp apparatus, 40 . . . control apparatus, 41 . . . communication port, 42 . . . timer, 43 . . . output port, 43 . . . input and output port, 44 . . . memory, 45 . . . . CPU, 46 . . . internal bus, 47 . . . device, 48 . . . control program, 49 . . . control data, 51 . . . control program, 52 . . . input and output control program, 53 . . . control program, 54 . . . input and output control program, 61 . . . right front lamp module, 62 . . . left front lamp module, 63 . . . right light emission controller, 64 . . . left light emission controller, 65 . . . actuator, 71 . . . low-beam light source, 72 . . . high-beam light source, 73 . . . application range, 74 . . . virtual illuminometer for each light source, 81 . . . illuminometer, 90 . . . evaluation simulation system, 91 . . . monitor image generation apparatus, 92 . . . model calculation apparatus, 93 . . . traveling environment generation apparatus, 94 . . . event generation apparatus, 95 . . . synchronous relay apparatus, 96 . . . information communication network, 98 . . . illuminometer, 99 . . . driver, 101 . . . driver monitor, 102 . . . camera image generation apparatus, 103 . . . camera module, 104 . . . camera monitor, 105 . . . vehicle outside camera, 110 . . . field-of-view image, 111 . . . oncoming vehicle (object), 112 . . . pedestrian (object), 113 . . . application range, 117 . . . section, 120 . . . virtual automobile (virtual vehicle), 121 . . . virtual pedestrian, 122 . . . virtual oncoming vehicle, 140 . . . monitor image generation apparatus, 141 . . . event generator, 142 . . . traveling environment generator, 143 . . . monitor image generator, 144 . . . object information acquirer

The invention claimed is:

1. An evaluation simulation system for a control including a front lamp control of a vehicle, the evaluation simulation system being configured to cause a front lamp control apparatus to operate when a virtual vehicle is caused to travel in a virtual space under an operation performed by a driver, the front lamp control apparatus being to be provided in the vehicle, the virtual vehicle corresponding to the vehicle, the evaluation simulation system comprising:
   a driver monitor configured to display, with respect to the driver, a field-of-view image from the virtual vehicle that is traveling, the field-of-view image being related to the virtual space;
   an operation member configured to receive the operation performed by the driver;
   a model calculator configured to calculate a movement of the virtual vehicle by executing a model control of the virtual vehicle, the movement of the virtual vehicle being based on the operation performed by the driver on the operation member;
   a monitor image generator configured to calculate at least a position and a direction of the virtual vehicle after the virtual vehicle moves in the virtual space, and generate the field-of-view image after the virtual vehicle moves, the position and the direction of the virtual vehicle being based on the movement of the virtual vehicle calculated by the model calculator;
   a camera module configured to display an image with respect to a vehicle outside camera provided in the virtual vehicle, the image being based on generation performed by the monitor image generator; and
   a detection control apparatus that is provided in the virtual vehicle together with the front lamp control apparatus, the detection control apparatus being configured to executes a control in association with the front lamp control apparatus, wherein
   the detection control apparatus configured to extract, based on a captured image obtained by the vehicle outside camera in the camera module, a virtual object for which a light distribution control is to be performed, output information regarding the virtual object to the front lamp control apparatus, and cause the front lamp control apparatus to operate, the virtual object being present around the virtual vehicle that is traveling in the virtual space,
   the model calculator is further configured to generate control output information related to the front lamp control apparatus by executing the model control of the virtual vehicle, and
   the monitor image generator is configured to acquire the control output information related to the front lamp control apparatus calculated by the model calculator, generate the field-of-view image under illumination by the front lamp control apparatus, and cause the driver monitor to display the field-of-view image.

2. The evaluation simulation system for the control including the front lamp control of the vehicle according to claim 1, wherein
   the monitor image generator is configured to generate a traveling environment image and output the traveling environment image to the model calculator, the traveling environment image including no illuminance caused by a control output of the front lamp control apparatus, and
   the model calculator is configured to generate the control output information related to the front lamp control apparatus by executing the model control of the virtual vehicle with use of the traveling environment image.

3. The evaluation simulation system for the control including the front lamp control of the vehicle according to claim 1, wherein
   the monitor image generator is configured to execute a process of generating the virtual space including an object, prior to generation of the field-of-view image,
   the monitor image generator is configured to generate position information related to the virtual object moving in the virtual space, and
   the model calculator is configured to generate control input information and the control output information related to the front lamp control apparatus by executing the model control of the virtual vehicle with use of the position information related to the virtual object generated by the monitor image generator.

4. The evaluation simulation system for the control including the front lamp control of the vehicle according to claim 1, the evaluation simulation system further comprising
   a relay apparatus coupled to a vehicle communication network and an information communication network, the vehicle communication network being a communication network to which control apparatuses including the front lamp control apparatus for the vehicle and the detection control apparatus for the vehicle are to be coupled, the information communication network being a communication network to which the model calculator and the monitor image generator are coupled, wherein
   the front lamp control apparatus is coupled to the vehicle communication network, and
   the relay apparatus is configured to relay information to be communicated between the model calculator or the monitor image generator and the front lamp control apparatus.

5. The evaluation simulation system for the control including the front lamp control of the vehicle according to claim 4, wherein the monitor image generator is configured to calculate illuminance of the virtual object moving in the virtual space, based on luminance of the field-of-view image to be displayed on the driver monitor.

6. The evaluation simulation system for the control including the front lamp control of the vehicle according to claim 5, wherein the monitor image generator is configured to divide the field-of-view image to be displayed on the driver monitor into sections, and calculate illuminance of each of the sections of the field-of-view image based on the luminance of the field-of-view image to be displayed on the driver monitor, and the monitor image generator is configured to calculate the illuminance of the virtual object moving in the virtual space, based on the illuminance of each of two or more of the sections, the two or more of the sections including the virtual object in the field-of-view image.

7. The evaluation simulation system for the control including the front lamp control of the vehicle according to claim 2, the evaluation simulation system further comprising a relay apparatus coupled to a vehicle communication network and an information communication network, the vehicle communication network being a communication network to which control apparatuses including the front lamp control apparatus for the vehicle and the detection control apparatus for the vehicle are to be coupled, the information communication network being a communication network to which the model calculator and the monitor image generator are coupled, wherein the front lamp control apparatus is coupled to the vehicle communication network, and the relay apparatus is configured to relay information to be communicated between the model calculator or the monitor image generator and the front lamp control apparatus.

8. The evaluation simulation system for the control including the front lamp control of the vehicle according to claim 3, the evaluation simulation system further comprising a relay apparatus coupled to a vehicle communication network and an information communication network, the vehicle communication network being a communication network to which control apparatuses including the front lamp control apparatus for the vehicle and the detection control apparatus for the vehicle are to be coupled, the information communication network being a communication network to which the model calculator and the monitor image generator are coupled, wherein the front lamp control apparatus is coupled to the vehicle communication network, and the relay apparatus is configured to relay information to be communicated between the model calculator or the monitor image generator and the front lamp control apparatus.

9. The evaluation simulation system for the control including the front lamp control of the vehicle according to claim 7, wherein the monitor image generator is configured to calculate illuminance of the virtual object moving in the virtual space, based on luminance of the field-of-view image to be displayed on the driver monitor.

10. The evaluation simulation system for the control including the front lamp control of the vehicle according to claim 8, wherein the monitor image generator is configured to calculate illuminance of the virtual object moving in the virtual space, based on luminance of the field-of-view image to be displayed on the driver monitor.

11. The evaluation simulation system for the control including the front lamp control of the vehicle according to claim 9, wherein the monitor image generator is configured to divide the field-of-view image to be displayed on the driver monitor into sections, and calculate illuminance of each of the sections of the field-of-view image based on the luminance of the field-of-view image to be displayed on the driver monitor, and the monitor image generator is configured to calculate the illuminance of the virtual object moving in the virtual space, based on the illuminance of each of two or more of the sections, the two or more of the sections including the virtual object in the field-of-view image.

12. The evaluation simulation system for the control including the front lamp control of the vehicle according to claim 10, wherein the monitor image generator is configured to divide the field-of-view image to be displayed on the driver monitor into sections, and calculate illuminance of each of the sections of the field-of-view image based on the luminance of the field-of-view image to be displayed on the driver monitor, and the monitor image generator is configured to calculate the illuminance of the virtual object moving in the virtual space, based on the illuminance of each of two or more of the sections, the two or more of the sections including the virtual object in the field-of-view image.

13. An evaluation simulation system for a control including a front lamp control of a vehicle, the evaluation simulation system being configured to cause a front lamp control apparatus to operate when a virtual vehicle is caused to travel in a virtual space under an operation performed by a driver, the front lamp control apparatus being to be provided in the vehicle, the virtual vehicle corresponding to the vehicle, the evaluation simulation system comprising:

a driver monitor configured to display, with respect to the driver, a field-of-view image from the virtual vehicle that is traveling, the field-of-view image being related to the virtual space;

an operation member configured to receive the operation performed by the driver;

a computer apparatus configured to calculate a movement of the virtual vehicle by executing a model control of the virtual vehicle, the movement of the virtual vehicle being based on the operation performed by the driver on the operation member, calculate at least a position and a direction of the virtual vehicle after the virtual vehicle moves in the virtual space, and generate the field-of-view image after the virtual vehicle moves, the position and the direction of the virtual vehicle being based on the calculated movement of the virtual vehicle, a camera module configured to display an image with respect to a vehicle outside camera provided in the virtual vehicle, the image being based on generation performed by the computer apparatus; and a detection control apparatus that is provided in the virtual vehicle together with the front lamp control apparatus, the detection control apparatus being configured to executes a control in association with the front lamp control apparatus, wherein the detection control apparatus configured to extract, based on a captured image obtained by the vehicle outside camera in the camera module, a virtual object for which a light distribution control is to be performed, output information regarding the virtual object to the front lamp control apparatus, and cause the front lamp control apparatus to operate, the virtual object being present around the virtual vehicle that is traveling in the virtual space, and the computer apparatus is configured to generate control output information related to the front lamp control apparatus by executing the model control of the virtual vehicle, and based on the control output information related to the front lamp control apparatus, generate the field-of-view image under illumination by the front lamp control apparatus, and cause the driver monitor to display the field-of-view image.

* * * * *